United States Patent
Choi et al.

(10) Patent No.: US 10,119,081 B2
(45) Date of Patent: *Nov. 6, 2018

(54) SUPERCRITICAL REACTOR SYSTEMS AND PROCESSES FOR PETROLEUM UPGRADING

(71) Applicant: Saudi Arabian Oil Company, Dhahran (SA)

(72) Inventors: Ki-Hyouk Choi, Dhahran (SA); Abdullah T. Alabdulhadi, Dhahran (SA); Mohammad A. Al-Abdullah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/894,409

(22) Filed: Feb. 12, 2018

(65) Prior Publication Data

US 2018/0163143 A1 Jun. 14, 2018

Related U.S. Application Data

(63) Continuation of application No. 15/377,351, filed on Dec. 13, 2016, now Pat. No. 9,920,258.

(Continued)

(51) Int. Cl.
*C10G 31/08* (2006.01)
*C10G 49/18* (2006.01)
(Continued)

(52) U.S. Cl.
CPC .............. *C10G 31/08* (2013.01); *B01J 3/008* (2013.01); *B01J 3/02* (2013.01); *C10G 11/10* (2013.01);
(Continued)

(58) Field of Classification Search
CPC .................................. C10G 31/08; C10G 49/18
See application file for complete search history.

(56) References Cited

U.S. PATENT DOCUMENTS

| 4,465,888 A | 8/1984 | Paspek, Jr. |
| 4,591,426 A | 5/1986 | Krasuk et al. |

(Continued)

FOREIGN PATENT DOCUMENTS

| CA | 2938409 A1 | 8/2015 |
| EP | 1 342 771 A1 | 9/2003 |

(Continued)

OTHER PUBLICATIONS

Abdulrazak et al., "Problems of Heavy Oil Transportation in Pipelines and Reduction of High Viscosity", Iraqi Journal of Chemical and Petroleum Engineering, 2015, vol. 16, No. 3, 1-9.

(Continued)

*Primary Examiner* — Renee Robinson
(74) *Attorney, Agent, or Firm* — Dinsmore & Shohl

(57) ABSTRACT

Supercritical upgrading reactors and reactor systems for upgrading a petroleum-based compositions comprising one or more catalyst layers and, in some embodiments, one or more purging fluid inlets, where one or more catalyst layers at least partially sift and convert heavy hydrocarbon fractions to light hydrocarbon fractions to produce an upgraded supercritical reactor product. In some embodiments, upgrading reactor systems comprise one or more supercritical upgrading reactors and one or more supercritical standby reactors alternating functions such that a supercritical upgrading reactor is converted to a supercritical standby reactor and the supercritical standby reactor is converted to a supercritical upgrading reactor, where the supercritical upgrading reactor upgrades a combined feed stream while a (Continued)

supercritical standby reactor delivers a cleaning fluid into the supercritical standby reactor.

11 Claims, 10 Drawing Sheets

Related U.S. Application Data

(60) Provisional application No. 62/267,406, filed on Dec. 15, 2015.

(51) Int. Cl.

| | | |
|---|---|---|
| *C10G 65/02* | (2006.01) | |
| *C10G 65/10* | (2006.01) | |
| *C10G 65/12* | (2006.01) | |
| *C10G 11/10* | (2006.01) | |
| *C10G 75/04* | (2006.01) | |
| *C10G 51/02* | (2006.01) | |
| *B01J 3/00* | (2006.01) | |
| *C10G 75/00* | (2006.01) | |
| *B01J 3/02* | (2006.01) | |

(52) U.S. Cl.
CPC ........... *C10G 49/18* (2013.01); *C10G 51/026* (2013.01); *C10G 65/02* (2013.01); *C10G 65/10* (2013.01); *C10G 65/12* (2013.01); *C10G 75/00* (2013.01); *C10G 75/04* (2013.01); *C10G 2300/70* (2013.01); *C10G 2300/703* (2013.01); *C10G 2300/805* (2013.01); *C10G 2300/807* (2013.01); *Y02P 20/544* (2015.11)

(56) References Cited

U.S. PATENT DOCUMENTS

| | | |
|---|---|---|
| 4,822,497 A | 4/1989 | Hong et al. |
| 5,387,398 A | 2/1995 | Mueggenburg et al. |
| 5,454,950 A | 10/1995 | Li et al. |
| 6,039,791 A | 3/2000 | Kazeef et al. |
| 6,306,287 B1 | 10/2001 | Billon et al. |
| 6,332,975 B1 | 12/2001 | Abdel-Halim et al. |
| 6,365,790 B2 | 4/2002 | Reimer et al. |
| 7,041,707 B2 | 5/2006 | Hahn |
| 7,435,330 B2 | 10/2008 | Hokari et al. |
| 7,591,983 B2 | 9/2009 | Takahashi et al. |
| 7,594,387 B2 | 9/2009 | Inage et al. |
| 7,740,065 B2 | 6/2010 | Choi |
| 2006/0260927 A1 | 11/2006 | Abazajian |
| 2008/0099374 A1 | 5/2008 | He et al. |
| 2008/0099376 A1 | 5/2008 | He et al. |
| 2008/0099378 A1 | 5/2008 | He et al. |
| 2009/0139902 A1 | 6/2009 | Kressmann et al. |
| 2009/0159489 A1 | 6/2009 | Lopez et al. |
| 2009/0159498 A1 | 6/2009 | Chinn et al. |
| 2009/0159504 A1 | 6/2009 | Choi et al. |
| 2009/0166262 A1 | 7/2009 | He et al. |
| 2011/0147266 A1 | 6/2011 | Choi |
| 2012/0061291 A1 | 3/2012 | Choi et al. |
| 2012/0061294 A1 | 3/2012 | Choi et al. |
| 2012/0181217 A1 | 7/2012 | Choi et al. |
| 2013/0140214 A1 | 6/2013 | Choi |
| 2013/0206645 A1 | 8/2013 | Yarbro |
| 2013/0319910 A1 | 12/2013 | Koseoglu et al. |
| 2014/0135540 A1 | 5/2014 | Iversen |
| 2014/0251871 A1 | 9/2014 | Choi et al. |
| 2014/0275676 A1 | 9/2014 | Sieli et al. |
| 2015/0321975 A1 | 11/2015 | Choi et al. |
| 2016/0312129 A1 | 10/2016 | Choi et al. |

FOREIGN PATENT DOCUMENTS

| | | |
|---|---|---|
| EP | 1 616 931 A1 | 1/2006 |
| EP | 1696019 A1 | 8/2006 |
| GB | 1298904 A | 12/1972 |
| JP | 2000109850 | 4/2000 |
| JP | 2003049180 | 2/2003 |
| KR | 100249496 B1 | 12/1999 |
| WO | 2008055152 A1 | 5/2008 |
| WO | 2013033301 A2 | 3/2013 |
| WO | 2015094948 A1 | 6/2015 |

OTHER PUBLICATIONS

Ates et al., "The Role of Catalyst in Supercritical Water Desulfurization", Applied Catalysis B: Environmental, 2014, 147, 144-155, Elsevier B.V.
Badger et al., "Viscosity Reduction in Extra Heavy Crude Oils", 461-465, The Laboratory for Hydrocarbon Process Chemistry, The Pennsylvania State University.
Escallon, Maria M., "Petroleum and Petroleum/Coal Blends as Feedstocks in Laboratory-Scale and Pilot-Scale Cokers to Obtain Carbons of Potentially High Value", A Thesis in Fuel Science, 2008, The Pennsylvania State University Graduate School.
Gateau et al., "Heavy Oil Dilution", Oil & Gas Science and Technology, 2004, vol. 59, No. 5, 503-509.
Hughes et al., "Conocophillips Delayed Coking Process", Handbook of Petroleum Refining Processes, 2003, Chapter 12, 3rd Edition, 12.3-12.31, McGraw-Hill, New York (NY).
International Search Report and Written Opinion pertaining to PCT/US2016/066129 dated Mar. 13, 2017.
International Search Report and Written Opinion pertaining to PCT/US2016/066132 dated Mar. 21, 2017.
International Search Report and Written Opinion pertaining to PCT/US2016/066294 dated Mar. 21, 2017.
Iqbal et al., "Unlocking Current Refinery Constraints", PTQ Q2 2008, www.digitalrefining.com/article/1000682.
Kishita et al., "Desulfurization of Bitumen by Hydrothermal Upgrading Process in Supercritical Water with Alkali", Journal of the Japan Petroleum Institute, 2006, 49 (4), 1779-185.
International Search Report and Written Opinion pertaining to PCT/US2016/066367 dated Nov. 10, 2017.
Office Action pertaining to U.S. Appl. No. 15/374,295 dated Oct. 31, 2017.
Office Action pertaining to U.S. Appl. No. 15/374,203 dated Oct. 31, 2017.
Notice of Allowance pertaining to U.S. Appl. No. 15/377,351 dated Nov. 7, 2017.
International Search Report pertaining to PCT International Application No. PCT/US2018/012027, filed Jan. 2, 2018, 5 pages.
Written Opinion pertaining to PCT International Application No. PCT/US2018/012027, filed Jan. 2, 2018, 6 pages.
Final Office Action dated Mar. 16, 2018, pertaining to U.S. Appl. No. 15/374,295, filed Dec. 9, 2016, 13 pages.
Notice of Allowance dated Mar. 22, 2018, pertaining to U.S. Appl. No. 15/374,203, filed Dec. 9, 2016, 8 pages.
International Search Report dated Mar. 23, 2018 for International Application No. PCT/US2017/068464, filed Dec. 27, 2017, 6 pages.
Written Opinion dated Mar. 23, 2018 for International Application No. PCT/US2017/068464, filed Dec. 27, 2017, 5 pages.
Notice of Allowance and Fees Due dated May 14, 2018 pertaining to U.S. Appl. No. 15/374,289.

SUPERCRITICAL REACTOR SYSTEMS AND PROCESSES FOR PETROLEUM UPGRADING

CROSS-REFERENCE TO RELATED APPLICATIONS

This application is a continuation of U.S. patent application Ser. No. 15/377,351 filed Dec. 13, 2016, which claims priority to U.S. Provisional Application 62/267,406, filed Dec. 15, 2015, which is incorporated by reference in its entirety.

TECHNICAL FIELD

Embodiments of the present disclosure generally relate to upgrading petroleum-based compositions, and more specifically relate to supercritical reactor systems, methods, and uses for upgrading petroleum-based compositions.

BACKGROUND

Petroleum is an indispensable source of energy; however, most petroleum is heavy or sour petroleum, meaning that it contains a high amount of impurities (including sulfur and coke, a high carbon petroleum residue). Heavy petroleum must be upgraded before it is a commercially valuable product, such as fuel.

Use of supercritical water is effective to upgrade heavy petroleum feedstock. However, supercritical water reactors generally include two types, downflow and upflow reactors, based on the direction the supercritical water and petroleum-based composition flows. In downflow supercritical reactors, heavy hydrocarbons fractions flow very quickly due to higher density, resulting in a shortened residence time (known as channeling). This may hinder upgrading due to a shortened residence time for reactions to occur with the higher carbon-containing molecules that tend to reside in the heavier fractions. Upflow supercritical reactors may also experience difficulties due to heavy fractions accumulating in the bottom of the reactor, which may affect the upgrading process and may plug the reactor.

To combat these deficiencies, catalysts may be used. Among various types of catalysts, water soluble or organic soluble catalysts may be used to provide increased contact with the reactants and improve temperatures and residence times. However, catalysts conventionally exhibit very low stability in supercritical water conditions. The harsh conditions of the supercritical reactants often cause breakdown of the catalyst and result in the formation of insoluble aggregates, which may become seeds for coke formation. Coke can plug the reactor, slowing or stopping the upgrading process.

SUMMARY

Accordingly, an ongoing need exists to upgrade heavy fractions while minimizing the formation of pre-coking materials in the process of upgrading petroleum-based compositions with supercritical reactors. Further, an ongoing need exists to remove pre-coking materials and other unwanted materials from the catalyst layers of supercritical reactors without stopping or delaying the upgrading reaction system process. The present embodiments utilize supercritical reactors to meet these needs while also discouraging pre-coke formation and removes unwanted materials plugging the catalyst layer.

In an embodiment of the disclosure, a process for upgrading a petroleum-based composition comprises combining a supercritical water stream with a pressurized, heated petroleum-based composition to create a combined feed stream. The combined feed stream is then introduced into an upgrading reactor system comprising one or more supercritical upgrading reactors, and is passed through a first catalyst layer, a second catalyst layer, or both. In the supercritical upgrading reactor, the second catalyst layer is disposed vertically below the first catalyst layer and has a greater void volume ratio than the first layer. One or both of the catalyst layers comprise a heterogeneous porous metal containing catalyst. The combined feed stream is passed through the first catalyst layer and the second catalyst layer, and light hydrocarbons in the combined feed stream at least partially flow through the first catalyst layer and the second catalyst layer while heavy hydrocarbons in the combined feed stream are at least partially sifted in voids of the first catalyst layer, voids of the second catalyst layer, or both. The first catalyst layer, the second catalyst layer, or both may at least partially convert heavy hydrocarbons to light hydrocarbons while the light hydrocarbons in the combined feed stream at least partially flow through one or both catalyst layers. The upgraded product comprising light hydrocarbons and converted light hydrocarbons is then passed out of the supercritical upgrading reactor.

In another embodiment, a process for upgrading a petroleum-based composition comprises combining a supercritical water stream with a pressurized, heated petroleum-based composition to create a combined feed stream, which is introduced to a supercritical upgrading reactor comprising at least one catalyst layer. The at least one catalyst layer is a heterogeneous porous metal having a void volume that at least partially sifts heavy hydrocarbon fractions in the combined feed stream while the light hydrocarbon fractions are allowed to flow through the at least one catalyst layer. This at least partially converts the heavy hydrocarbon fractions to light hydrocarbon fractions. Purging fluid is injected through one or more purging fluid inlets into the at least one catalyst layer and passing an upgraded product out of the supercritical upgrading reactor.

In another embodiment, a process for upgrading a petroleum-based composition combining a supercritical water stream with a pressurized, heated petroleum-based composition to create a combined feed stream. The combined feed stream is then introduced into an upgrading reactor system comprising one or more supercritical upgrading reactors and one or more supercritical standby reactors, where both reactors operate at a temperature greater than the critical temperature of water and a pressure greater than the critical pressure of water. Both the supercritical upgrading reactor and the supercritical standby reactor comprise at least one catalyst layer having a void volume ratio and comprising a heterogeneous porous metal containing catalyst. In the supercritical upgrading reactor, the combined feed stream is upgraded to produce an upgraded product. While the supercritical upgrading reactor is performing an upgrading step, the supercritical standby reactor is utilizing a cleaning fluid to clean the reactor while in standby mode. The method further comprises alternating the functions of the supercritical upgrading reactor and the supercritical standby reactor to convert the supercritical upgrading reactor to a supercritical standby reactor and to convert the supercritical standby reactor to a supercritical upgrading reactor.

In another embodiment, a reactor for upgrading a petroleum-based composition comprises a first catalyst layer, a second catalyst layer disposed vertically below the first catalyst layer in the supercritical reactor, and a plurality of purging fluid inlets disposed proximate to the first catalyst layer, the second catalyst layer, or both. The first catalyst layer and the second catalyst layer comprise at least a heterogeneous porous metal containing catalyst. The first catalyst layer comprises a first void volume ratio and the second catalyst layer comprises at least a second void volume ratio, and the at least a second void volume ratio is lesser than the first void volume ratio.

In another embodiment, a reactor for upgrading a petroleum-based composition comprises a first catalyst layer and a second catalyst layer. The second catalyst layer is disposed vertically below the first catalyst layer in the supercritical reactor, and the first catalyst layer and the second catalyst layer comprise at least a heterogeneous porous metal containing catalyst. The first catalyst layer comprises a first void volume ratio and the second catalyst layer comprises a second void volume ratio where the second void volume ratio is lesser than the first void volume ratio.

In yet another embodiment, a reactor for upgrading a petroleum-based composition comprises at least one catalyst layer, where the at least one catalyst layer comprises a heterogeneous porous metal containing catalyst having a void volume ratio, and at least one purging fluid inlet disposed proximate the at least one catalyst layer and configured to deliver purging fluid to the at least one catalyst layer.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

DETAILED DESCRIPTION

Figure 1:
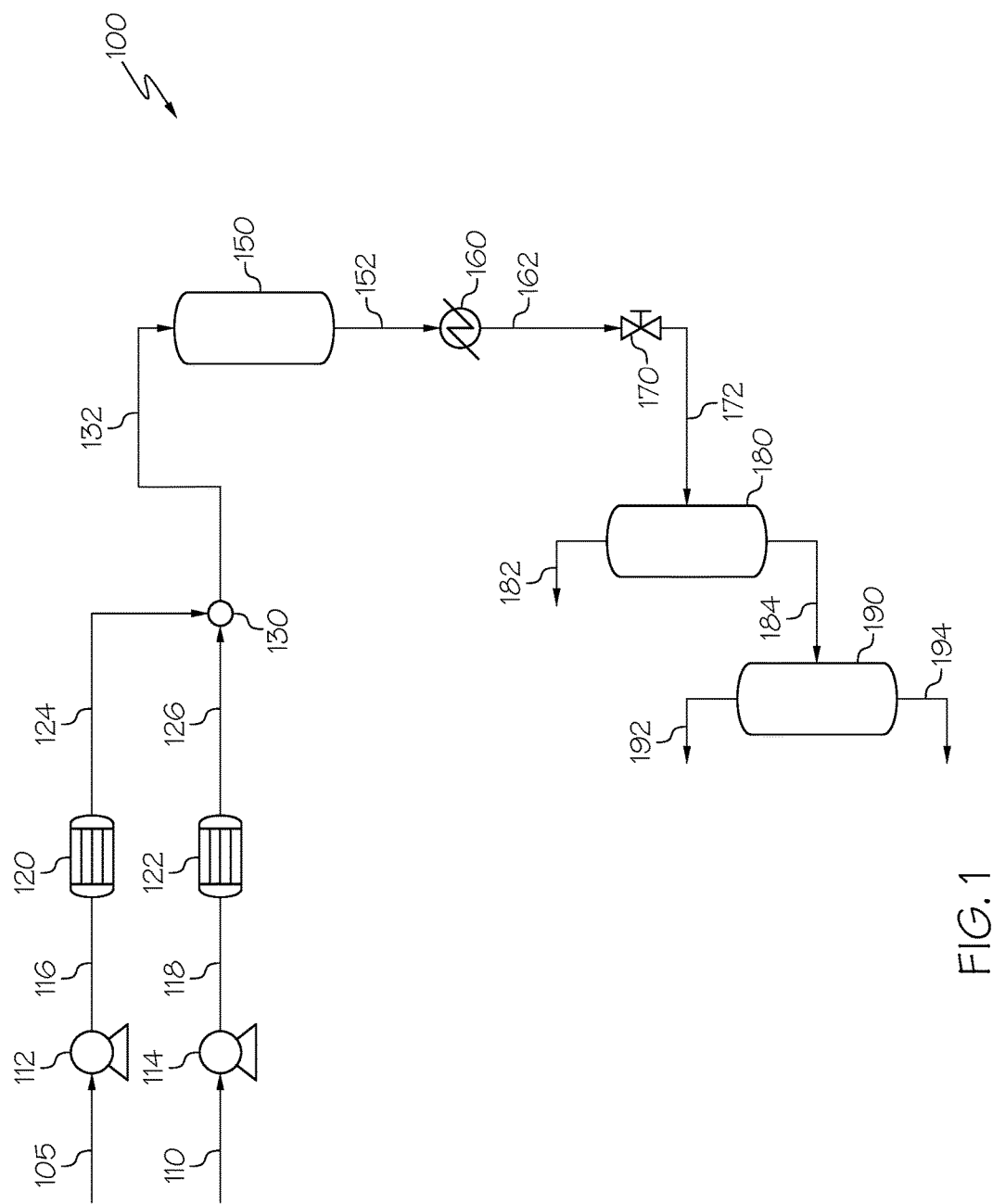
FIG. 1 is a schematic view of the process for upgrading petroleum-based compositions using an upgrading reactor system.

Embodiments of the present disclosure are directed to supercritical upgrading reactors and upgrading reactor systems. The embodiments include, among other things, a supercritical upgrading reactor comprising one or more catalyst layers; a supercritical upgrading reactor comprising one or more catalyst layers and one or more purging fluid inlets; an upgrading reactor system comprising one or more supercritical upgrading reactors; and an upgrading reactor system comprising one or more supercritical upgrading reactors and one or more supercritical standby reactors.

As used throughout the disclosure, "supercritical" refers to a substance at a pressure and a temperature greater than that of its critical pressure and temperature of water, such that distinct phases do not exist and the substance may exhibit the diffusion of a gas while dissolving materials like a liquid. At a temperature and pressure greater than the critical temperature and pressure, the liquid and gas phase boundary of water disappears, and the fluid has characteristics of both fluid and gaseous substances. Supercritical water is able to dissolve organic compounds like an organic solvent and has excellent diffusibility like a gas. Regulation of the temperature and pressure allows for continuous "tuning" of the properties of the supercritical water to be more liquid or more gas-like. Supercritical water has reduced density and lesser polarity, as compared to liquid-phase sub-critical water, thereby greatly extending range of potential reactions that can be carried out in water. Supercritical water is an effective solvent or diluent in the thermal processing of heavy oil to reduce overcracking or coking.

Without being bound by theory, supercritical water has various unexpected properties as it reaches supercritical boundaries. Supercritical water has very high solubility toward organic compounds and has an infinite miscibility with gases. Furthermore, radical species can be stabilized by supercritical water through the cage effect (that is, a condition whereby one or more water molecules surrounds the radical species, which then prevents the radical species from interacting). The stabilization of radical species may help prevent inter-radical condensation and thereby reduces the overall coke production in the current embodiments. For example, coke production can be the result of the inter-radical condensation. In certain embodiments, supercritical water generates hydrogen gas through a steam reforming reaction and water-gas shift reaction, which is then available for the upgrading reactions.

In the supercritical water process, thermal cracking reactions may be controlled by the presence of supercritical water to avoid overcracking and coking. Supercritical water has a very low dielectric constant which makes it compatible with common organic solvents such as toluene and dichloromethane. While supercritical water can dissolve a wide range of hydrocarbons, the high temperature conditions of supercritical water can cause other side reactions before the supercritical water dissolves hydrocarbons. For example, the exposure of benzopyrene to water in high temperature conditions for a longer period than desirable can cause the formation of coke.

Specific embodiments will now be described with references to the figures. Whenever possible, the same reference numerals will be used throughout the drawings to refer to the same or like parts.

FIG. 1 depicts one embodiment of a process 100 for an upgrading reactor system. As shown in FIG. 1, a petroleum-based composition 105 may be pressurized in a pump 112 to create a pressurized petroleum-based composition 116. The pressure of pressurized petroleum-based composition 116 may be at least 22.1 megapascals (MPa), which is approximately the critical pressure of water. Alternatively, the pressure of the pressurized petroleum-based composition 116 may be between 22.1 MPa and 32 MPa, or between 23 MPa and 30 MPa, or between 24 MPa and 28 MPa. In some embodiments, the pressure of the pressurized petroleum-based composition 116 may be between 25 MPa and 29 MPa, 26 MPa and 28 MPa, 25 MPa and 30 MPa, 26 MPa and 29 MPa, or 23 MPa and 28 MPa.

The petroleum-based composition 105 may refer to any hydrocarbon source derived from petroleum, coal liquid, or biomaterials. Possible hydrocarbon sources for petroleum-based composition 105 may include whole range crude oil, distilled crude oil, residue oil, topped crude oil, product streams from oil refineries, product streams from steam cracking processes, liquefied coals, liquid products recovered from oil or tar sands, bitumen, oil shale, asphaltene, biomass hydrocarbons, and the like. In a specific embodiment, the petroleum-based composition 105 may include atmospheric residue (AR), vacuum gas oil (VGO), or vacuum residue (VR).

Referring again to FIG. 1, the pressurized petroleum-based composition 116 may be heated in one or more petroleum pre-heaters 120 to form pressurized, heated petroleum-based composition 124. In one embodiment, the pressurized, heated petroleum-based composition 124 has a pressure greater than the critical pressure of water, as previously described, and may have a temperature of greater than 75° C. Alternatively, the temperature of the pressurized, heated petroleum-based composition 124 is between 10° C. and 300° C., or between 50° C. and 250° C., or between 75° C. and 200° C., or between 50° C. and 150° C., or between 50° C. and 100° C. In some embodiments, the temperature of the pressurized, heated petroleum-based stream 124 may be between 75° C. and 225° C., or between 100° C. and 200° C., or between 125° C. and 175° C., or between 140° C. and 160° C.

Embodiments of the petroleum pre-heater 120 may include a natural gas fired heater, heat exchanger, or an electric heater or any type of heater known in the art. In some embodiments, the pressurized, heated petroleum-based composition 124 is heated in a double pipe heat exchanger or shell tube heat exchanger later in the process.

As shown in FIG. 1, the water stream 110 may be any source of water, such as a water stream having conductivity of less than 1 microsiemens (µS)/centimeters (cm) such as less than 0.5 µS/cm or less than 0.1 µS/cm. The water streams 110 may also include demineralized water, distillated water, boiler feed water (BFW), and deionized water. In at least one embodiment, water stream 110 is a boiler feed water stream. Water stream 110 is pressurized by pump 114 to produce pressurized water stream 118. The pressure of the pressurized water stream 118 is at least 22.1 MPa, which is approximately the critical pressure of water. Alternatively, the pressure of the pressurized water stream 118 may be between 22.1 MPa and 32 MPa, or between 22.9 MPa and 31.1 MPa, or between 23 MPa and 30 MPa, or between 24 MPa and 28 MPa. In some embodiments, the pressure of the pressurized water stream 118 may be 25 MPa and 29 MPa, 26 MPa and 28 MPa, 25 MPa and 30 MPa, 26 MPa and 29 MPa, or 23 MPa and 28 MPa.

Referring again to FIG. 1, the pressurized water stream 118 may then be heated in a water pre-heater 122 to create a supercritical water stream 126. The temperature of the supercritical water stream 126 is greater than 374° C., which is approximately the critical temperature of water. Alternatively, the temperature of the supercritical water stream 126 may be between 374° C. and 600° C., or between 400° C. and 550° C., or between 400° C. and 500° C., or between 400° C. and 450° C., or between 450° C. and 500° C.

Similar to petroleum pre-heater 120, suitable water pre-heaters 122 may include a natural gas fired heater, a heat exchanger, and an electric heater. The water pre-heater 122 may be a unit separate and independent from the petroleum pre-heater 120.

As mentioned, supercritical water has various unexpected properties as it reaches its supercritical boundaries of temperature and pressure. For instance, supercritical water may have a density of 0.123 grams per milliliter (g/mL) at 27 MPa and 450° C. In comparison, if the pressure was reduced to produce superheated steam, for example, at 20 MPa and 450° C., the steam would have a density of only 0.079 g/mL. Without being bound by theory, fluids having a closer density to hydrocarbons may react with superheated steam to evaporate and mix into the liquid phase, leaving behind a heavy fraction that may generate coke upon heating. The formation of coke or coke precursor may plug the lines and must be removed. Therefore, supercritical water is superior to steam in some applications.

Referring again to FIG. 1, the supercritical water stream 126 and the pressurized heated petroleum stream 124 may be mixed in a feed mixer 130 to produce a combined feed stream 132. The feed mixer 130 can be any type of mixing device capable of mixing the supercritical water stream 126 and the pressurized heated petroleum stream 124. In one embodiment, feed mixer 130 may be a mixing tee, homogenizing mixer, an ultrasonic mixer, a small continuous stir tank reactor (CSTR), or any other suitable mixer. The volumetric flow ratio of supercritical water to petroleum fed to the feed mixer 130 may vary to control the ratio of water-to-oil (water:oil). In one embodiment, the volumetric flow ratio may be from 10:1 to 1:10, or 5:1 to 1:5, or 4:1 to 1:1 at standard ambient temperature and pressure (SATP). Without being bound by any particular theory, controlling the water:oil ratio may aid in converting olefins to other components, such as iso-paraffins. In some embodiments, the ratio of water:oil may be greater than 1 to prevent the formation of coke. In some embodiments, the ratio of water:oil may be less than 5, as diluting the olefin solution may allow for olefins to pass through the supercritical upgrading reactor 150 unreacted and the supercritical upgrading reactor 150 may require additional energy consumption to heat the large amounts of water if the ratio of water:oil is greater than 10.

Still referring to FIG. 1, the combined feed stream 132 may then be introduced to the reactor system configured to upgrade the combined feed stream 132. The combined feed stream 132 is introduced through an inlet port of the supercritical upgrading reactor 150. The supercritical upgrading reactor 150 depicted in FIG. 1 is a downflow reactor where the inlet port is disposed near the top of the supercritical upgrading reactor 150 and the outlet port is disposed near the bottom of the supercritical upgrading reactor 150. Alternatively, it is contemplated that the supercritical upgrading reactor 150 may be an upflow reactor where the inlet port is disposed near the bottom of the reactor. A downflow reactor is a reactor where the petroleum upgrading reactions occur as the reactants travel downward through the reactor. Conversely, an upflow reactor is a reactor where the petroleum upgrading reactions occur as the reactants travel upward through the reactor.

The supercritical upgrading reactor 150 may operate at a temperature greater than the critical temperature of water and a pressure greater than the critical pressure of water. In one or more embodiments, the supercritical upgrading reactor 150 may have a temperature of between 400° C. to 500° C., or between 420° C. to 460° C. The supercritical upgrading reactor 150 may be an isothermal or non-isothermal reactor. Moreover, additional components, such as a stirring rod or agitation device may also be included in the supercritical upgrading reactor 150.

The supercritical upgrading reactor 150 may have dimensions defined by the equation L/D, where L is a length of the supercritical upgrading reactor 150 and D is the diameter of the supercritical upgrading reactor 150. In one or more embodiments, the L/D value of the supercritical upgrading reactor 150 may be sufficient to achieve a superficial velocity of fluid greater than 0.5 meter (m)/minute (min), or an L/D value sufficient to a achieve superficial velocity of fluid between 1 m/min and 5 m/min. The fluid flow may be defined by a Reynolds number greater than 5000.

Figure 2:
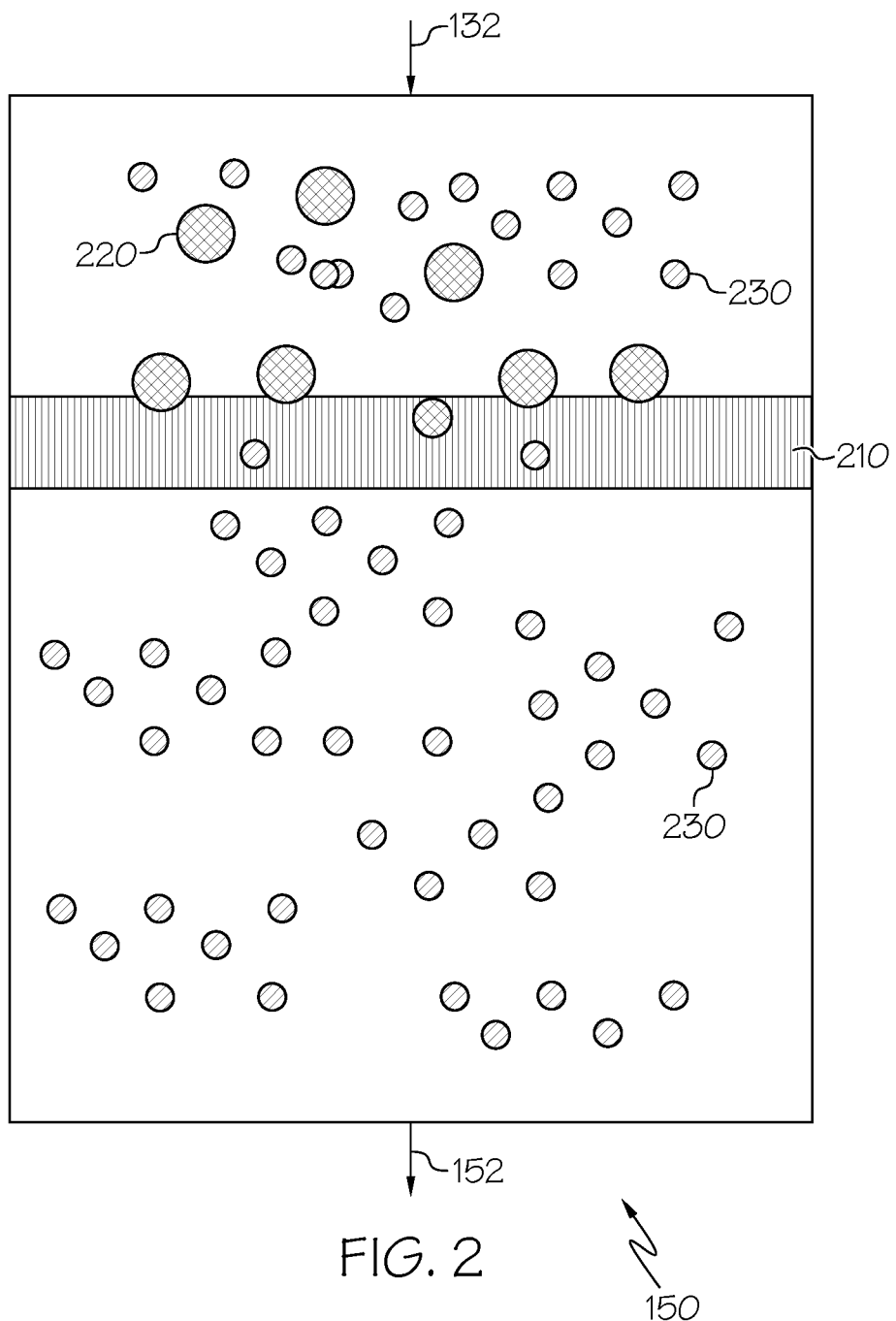
FIG. 2 is a schematic view of a catalyst layer in a supercritical upgrading reactor.

Referring now to FIG. 2, an enlarged schematic view of a supercritical upgrading reactor 150 is shown. The supercritical upgrading reactor 150, as shown in FIG. 2, may contain a catalyst layer 210. While the embodiment shown in FIG. 2 has only one catalyst layer 210, it should be understood that any number of catalyst layers 210 may be utilized. In some embodiments, the supercritical upgrading reactor 150 may have two or more, or three or more, or five or more catalyst layers 210. In some embodiments, the supercritical upgrading reactor 150 may have 10 or more, or 15 or more, or 20 or more catalyst layers 210.

As shown in FIG. 2, the combined feed stream 132 may be introduced to the supercritical reactor 150 through an inlet port, which may be located on the top or bottom of the supercritical upgrading reactor 150. The combined feed stream 132 may both comprise heavy fractions 220 and light fractions 230.

Heavy fractions 220 may refer to readily insoluble fractions in the combined feed stream 132. A heavy fraction 220 refers to a hydrocarbon having more than 15 carbons. A heavy fraction 220 may include, but is not limited to asphaltenes, heavy oils, hydrocarbons which are classified to be lube base oils, other hydrocarbon aggregates, polynuclear aromatics, polyaromatics, long-chain alkyl aromatics, paraffinic waxes, polynaphthalenes, heterorganics, vacuum fractions, atmospheric residue and combinations of these. The heavy fraction 220 may comprise a mixture of diesel, vacuum gas oil and vacuum residue, a known mixture to those of ordinary skill in the industry. A heavy fraction 220 may typically have a boiling point greater than 270° C. In some embodiments, a heavy fraction 220 may have more than 24 carbons and a boiling point greater than 340° C. The heavy fraction 220 may not be sifted through the catalyst layer 210 until it is upgraded into a light fraction 230. As used throughout the disclosure, "to sift" or "sifted" refers to the selectivity of the pores in the catalyst layer 210 to block particles by size exclusion. The particles in the light fraction 230 may be of a sufficient size to pass through the pores in the catalyst layer 210, while the particles of the heavy fraction 220 may be blocked by size exclusion until they are broken down to smaller, passable particles.

Light fractions 230 may comprise hydrocarbons with less than 15 carbons. The light fractions 230 in some embodiments will have a molecular weight of less than 210 grams per mole (g/mol) and a boiling point of less than 270° C. The molecular weight of 210 g/mol is based on an estimated correlation between molecular weight versus boiling point, specific gravity (density) and viscosity using the "Twu" correlation. The light fraction 230 may comprise naphtha, kerosene, diesel, and similar compounds.

As the combined feed stream 132 is passed through the catalyst layer 210, the heavy fractions 220 may be at least partially sifted by the catalyst layer 210. The catalyst layer 210 may at least partially upgrade the heavy fractions 220, breaking them down into lighter carbon-containing compounds to form more of the light fraction 230. The light fraction 230 may be comprised of lighter, smaller hydrocarbon compounds that are able to pass through the porous catalyst layer 210. The supercritical upgrading reactor product 152 comprises light fractions 230 which exit the supercritical upgrading reactor 150 through an outlet port disposed opposite of the inlet port in the supercritical upgrading reactor 150. In other embodiments, the outlet port may not be opposite of the inlet port, such as an outlet port located on a side of the supercritical upgrading reactor 150.

Referring again to FIG. 2, the catalyst layer 210 may comprise, among other things, a heterogeneous porous metal-containing catalyst material. The catalyst material may be selected from transition metals, including but not limited to Ti, Cr, Mn, Fe, Co, Ni, Cu, Zn, Zr, Mo, and alloys thereof. In some embodiments, the catalyst material may be selected from precious metals, including but not limited to Au, Ag, Pt, Ru, Rh, Os, and alloys thereof. The catalyst material may comprise a metal that has been coated with another metal, for example, gold coated on titanium metal. The catalyst material may, in some embodiments, comprise promoters. The promoters may be selected from alkali and alkaline earth metals. The promoters may, in some embodiments, comprise K, Li, P, B, and other similar elements. In another embodiment, the catalyst material may comprise a nickel-containing alloy. Commercially suitable embodiments include Hastelloy C-276 alloy produced by Haynes International, or Inconel-600/625 corrosion resistant alloy, Monel-400 nickel copper alloy, and Incoloy-800 corrosion resistant alloy, produced by Specials Metals Corporation. In some embodiments, the catalyst material may comprise from 55 wt % to 60 wt % nickel alloy with Mo, Cr, Fe, and W. Without being bound by any particular theory, austenitic nickel-chromium based superalloys may be used to allow the nickel to survive the harsh conditions of the supercritical upgrading reactor 150. Furthermore, in some embodiments, the nickel can be oxidized to become nickel oxide, which may enhance reactions in the supercritical upgrading reactor 150.

As mentioned, conventionally, catalysts are not used in supercritical reactors due to their instability in supercritical conditions. However, the present embodiments may, in some embodiments, comprise one or more catalyst layers 210 that do not break down under supercritical conditions. The one or more catalyst layers 210 may, in some embodiments, react with the heavy fractions 220 to at least partially upgrade the heavy fractions 220 to light fractions 230. In some embodiments, the one or more catalyst layers 210 may act similarly to a static mixer by mixing the heavy fractions 220. Heavy fractions 220 are typically not readily soluble, even in supercritical water reactors, due to short residence times and relatively low turbulence. The one or more catalyst layers 210 may provide additional turbulence by sifting, mixing, chemically reacting the heavy fractions 220, or may utilize any combination of these techniques to at least be partially upgrade the heavy fractions 220 into light fractions 230.

In some embodiments, the catalyst layer 210 may solid. The catalyst layer 210 may, in some embodiments, be porous or structurally packed in various suitable arrangements. The woven catalyst layer may have various weaves and weave structures, for example, catalyst may be characterized by a mesh structure. For example, the catalyst layer 210 may have a weave structure of 10 mesh (wires per inch) to 400 mesh, or from 20 mesh to 200 mesh, or from 40 mesh to 100 mesh. In further examples, the catalyst layer 210 may comprise metallic honeycombs, sintered metal disks, and metallic woven cloth. The catalyst layer 210 may have various weave structures.

In some embodiments, the catalyst material may be treated to activate the surface of the catalyst layer 210, such as through heat treatment or oxidation. For a non-limiting example, the catalyst material may be heat-treated in air for at least one hour at a temperature greater than 400° C. but less than the melting point of the catalyst material before being installed into the supercritical upgrading reactor 150. The catalyst material may be heat-treated with an electrical current, microwave, infrared (IR) or ultraviolet (UV) heating to activate or regenerate the catalyst. In some embodiments, the electrical current may be kept constant through the membrane or wire which may, in some embodiments, be electrically insulated from the supercritical upgrading reactor 150. In some embodiments, an electrical current may reverse poisoning reactions and maintain a regenerated catalyst surface. Without being bound by any particular theory, heat treatment may generate an oxide, such as nickel oxide, on the surface of the catalyst. Flowing electric currents, irradiation of IR or UV lights may enhance the surface oxidation of the catalyst material to form, for instance, a high nickel alloy. Furthermore, in some embodiments the electrical current may reverse or prevent poisoning reactions caused by the strong adsorption of sulfur species and large molecules, such as asphaltene and coke, on the surface of the catalytic material.

In some embodiments, the catalyst layer 210 may be conditioned with supercritical water at reaction conditions. Conditioning the catalyst layer 210 may remove radical oxygen adsorbed on the catalyst before the catalyst layer 210 is contacted with the combined feed stream 132. The catalyst layer 210 may be conditioned for several hours, such as a period of at least more than two hours. The catalyst layer 210 may be conditioned prior to the introduction of the combined feed stream 132 into the supercritical upgrading reactor 150. The catalyst layer 210 may be activated prior to the inclusion in the supercritical upgrading reactor 150. Activation may include oxidation, reduction, and redox treatments.

Without intent to be bound by any particular theory, the catalyst layer 210 may accelerate a multitude of reactions, including but not limited to, reforming reactions, gas-water shift reactions, hydrogen donation, hydrogenation, hydrodesulfurization, hydrodenitrogenation, and hydrodemetallization. The catalyst layer 210 may accelerate a reforming reaction, where hydrocarbons react with water to generate hydrogen and carbon monoxide, which reacts with water to again generate hydrogen and carbon dioxide, similar to a water-gas shift reaction. The catalyst layer 210 may also accelerate a hydrogen donation reaction, including where hydrogen is extracted from asphaltene in crude oil. The catalyst layer 210 may accelerate hydrogenation reactions, such as the hydrogenation of unsaturated bonds produced from thermal cracking. The catalyst layer 210 may additionally accelerate reactions such as hydrodesulfurization, hydrodenitrogenation, or hydrodemetallization, for example, where hydrogen is generated by a reforming reaction and the hydrogenation removes sulfur, nitrogen, and metals.

Figure 3:
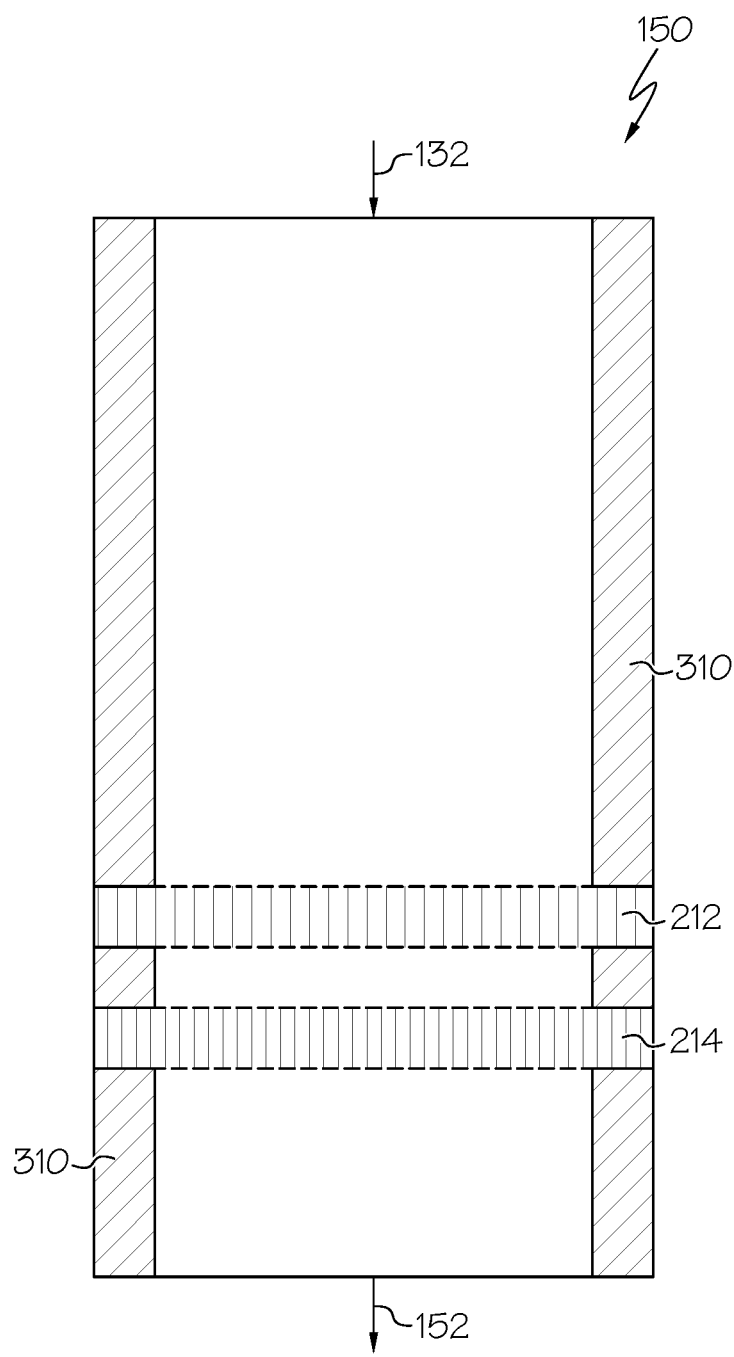
FIG. 3 is a schematic view of one embodiment of a supercritical upgrading reactor comprising two catalyst layers.

Now referring to FIG. 3, another schematic view of an embodiment of a supercritical upgrading reactor 150 is depicted in which the supercritical upgrading reactor 150 contains an insert 310. The supercritical upgrading reactor 150 of this embodiment comprises two catalyst layers 212, 214. The insert 310 may include a metal tube fit into the inner diameter of the supercritical upgrading reactor 150. For example, the insert 310 may be coaxially disposed within the outer walls of the supercritical upgrading reactor 150. In one or more embodiments, the insert 310 may be supportive in nature, which may allow a first catalyst layer 212 and a second catalyst layer 214 to attach to the outer wall of the supercritical upgrading reactor 150. The insert 310 may physically support the catalyst layers 212, 214, and may be removed for cleaning or easily changed if deformed by the flow of the combined feed stream 132. The insert 310 could also be utilized with one catalyst layer 210, as discussed with reference to FIG. 2. Various compositions are contemplated for the insert 310. In one embodiment, the insert 310 may comprise stainless steel, such as Steel Use Stainless (SUS) 316 Grade Stainless Steel. The insert 310 may in some embodiments have a thickness of 1 mm to 50 mm, or a thickness of 1 mm to 10 mm, or a thickness of 5 mm. The thickness of the insert 310 may, in some embodiments, be between $\frac{1}{100}$ and $\frac{1}{10}$ of reactor inner radius. The insert 310 may, in some embodiments, be an annular insert. In some embodiments, the catalyst layers 212, and 214, the purging fluid inlets 710, which will be discussed with reference to FIG. 4, or both, may penetrate through the reactor walls 512 and into the insert 310. In some embodiments, the reactor wall 512 may be an outermost metal tubular wall.

FIG. 3 depicts a supercritical upgrading reactor 150 in a downflow configuration, but could alternatively comprise a supercritical upgrading reactor 150 in an upflow configuration in some embodiments. As previously mentioned with regards to FIG. 2, the combined feed stream 132 may comprise heavy fractions and light fractions. As the combined feed stream 132 is passed through the first catalyst layer 212, the second catalyst layer 214, or both, the heavy fractions are at least partially sifted by the catalyst layer 212, 214, or both, and at least partially upgraded by the catalyst layer 212, 214, or both, to light fractions. The light fractions are able to pass through the porous catalyst layers 212, 214, or both. Once sifted and upgraded, the supercritical upgrading reactor product 152 exits the supercritical upgrading reactor 150 through an outlet port disposed opposite of the inlet port. As the molecules must have been small enough to sift through the catalyst layers 212, 214, the supercritical upgrading reactor product 152 may comprise light fractions and may not comprise heavy fractions. In the embodiment depicted by FIG. 3, the first catalyst layer 212 is the first catalyst layer to encounter the combined feed stream 132. It should be noted that in a supercritical upgrading reactor 150 in an upflow configuration, the first catalyst layer 212 may be the bottom-most catalyst layer.

In some embodiments, the first catalyst layer 212 and the second catalyst layer 214 may include the same or different compositions. In some embodiments, the first catalyst layer 212 and the second catalyst layer 214 may include different compositions in order to achieve different functionality. Without being bound by theory, the primary function of the first catalyst layer 212 may be cracking large molecules into smaller molecules that are passed to the second catalyst layer 214. Meanwhile, the second catalyst layer 214 can have compositions directed to boosting reforming reactions for generating hydrogen, which can travel through the downflow supercritical upgrading reactor 150. These compositions may include but are not limited to transition metal oxides, such as iron oxides. Hydrogen generated in the second catalyst layer 214 can diffuse back to the first catalyst layer 212 to improve the cracking reactions in the first catalyst layer 212.

Still referring to FIG. 3, the first and second catalyst layer, 212 and 214, may have different void volume ratios. In some embodiments, the first catalyst layer 212 will have a first void volume ratio and the second catalyst layer 214 will have a second void volume ratio, which may differ or be the same as the first void volume ratio. In one or more embodiments, the second void volume ratio of the second catalyst layer 214 may be greater than or less than the first void volume ratio of the first catalyst layer 212. In a further embodiment, the second void volume ratio of the second catalyst layer 214 may be less than the first void volume ratio of the first catalyst layer 212. A void volume ratio refers to the comparison of the volume of the void space in the catalyst layer when compared to the volume of solid surfaces in the catalyst layer. A relatively small void volume ratio indicates that more surface area is present in the catalyst layer when compared to a catalyst layer with a greater void volume ratio. The first catalyst layer 212 may have a greater void volume ratio when compared to the second catalyst layer 214, to accommodate large heavy fractions 220 to be upgraded without plugging the catalyst layer.

The void volume ratio may be defined as:

$$\text{Void Volume Ratio} = 1 - \left(\frac{V_{actual}}{V_{apparent}}\right)$$

In this equation, $V_{apparent}$ refers to the apparent volume of the catalyst layer while $V_{actual}$ refers to the actual volume of the entire catalyst layer, meaning the volume of the catalyst layer excluding void spaces and pore volume. Apparent volume refers to the bulk volume as defined in American Society for Testing and Materials (ASTM) Standard D-3766, which is measured by estimating the physical dimension of the catalyst in accordance with the method described in ASTM D-6683. Actual volume refers to the true volume as measured using a pycnometer in accordance with ASTM C-604.

The greater void volume ratio of the first catalyst layer 212, which contacts the petroleum-based composition 105 feed first, may allow the first catalyst layer 212 to have wider pores to sift the large, heavy hydrocarbons from the combined feed stream 132. These sifted heavy hydrocarbons are then cracked into smaller molecules, which may optionally be further cracked in the second catalyst layer 214, which may have narrower pores than the first catalyst layer 212. In further embodiments, it is contemplated to include additional catalyst layers, which may have even narrower pores to allow further cracking and upgrading reactions, thus producing smaller, more upgraded hydrocarbons.

Various void volume ratios are contemplated for the catalyst layers 212 and 214. For example, the void volume ratios (based on the equation previously discussed) may be from 0.1 to 0.9, or from 0.25 to 0.75, or from 0.3 to 0.6, or from 0.35 to 0.5. In one or more downflow reactor embodiments, the ratio of the void volume ratios, that is the void volume ratio of the first catalyst layer divided by the void volume ratio of the second layer, is from 1 to 50, or from 1 to 10, or from 1 to 5, or from 1 to 2.

Still referring to FIG. 3, the first catalyst layer 212 and the second catalyst layer 214 may be in contact with one another or may alternatively be spaced a distance apart. The first catalyst layer 212 and the second catalyst layer 214 may be spaced a part a distance of at least 10% of the length of the supercritical upgrading reactor 150. In other embodiments, the first catalyst layer 212 and the second catalyst layer 214 may be spaced a part a distance of at least 5%, or at least 8%, or at least 15%, or at least 20%, or at least 30% of the length of the supercritical upgrading reactor 150. In some embodiments, the first catalyst layer 212 is located at least halfway down the upgrading supercritical reactor 150 length, such that the first catalyst layer 212 is below at least 50% of the reactor volume. In other embodiments, the first catalyst layer 212 is located below at least 60% of the reactor volume, or at least 65% of the reactor volume, or at least 75% of the reactor volume, or at least 80% of the reactor volume. In some embodiments, the first catalyst layer 212 may be from 1 mm to 500 mm away from the second catalyst layer 214 when measured from the center of the first catalyst layer 212 to the center of the second catalyst layer 214. In other embodiments, the first catalyst layer 212 may be from 1 mm to 350 mm, or from 1 mm to 200 mm, or from 1 mm to 100 mm away from the second catalyst layer 214. In some embodiments, the first catalyst layer 212 may touching the second catalyst layer 214, or may be less than 1 mm apart from the second catalyst layer 214.

The first catalyst layer 212 and the second catalyst layer 214 may also have similar or different thicknesses and diameters. In some embodiments, first catalyst layer 212 may have a thickness greater than the second catalyst layer 214. In other embodiments, the first catalyst layer 212 may have a thickness less than the second catalyst layer 214. The thickness of the catalyst layers 212, 214 may range from less than 1 mm to 350 mm, or from 1 to 200 mm, or from 20 to 100 mm, when measured from the top of the catalyst layer 212, 214 to the bottom of the catalyst layer 212, 214, respectively.

Figure 4:
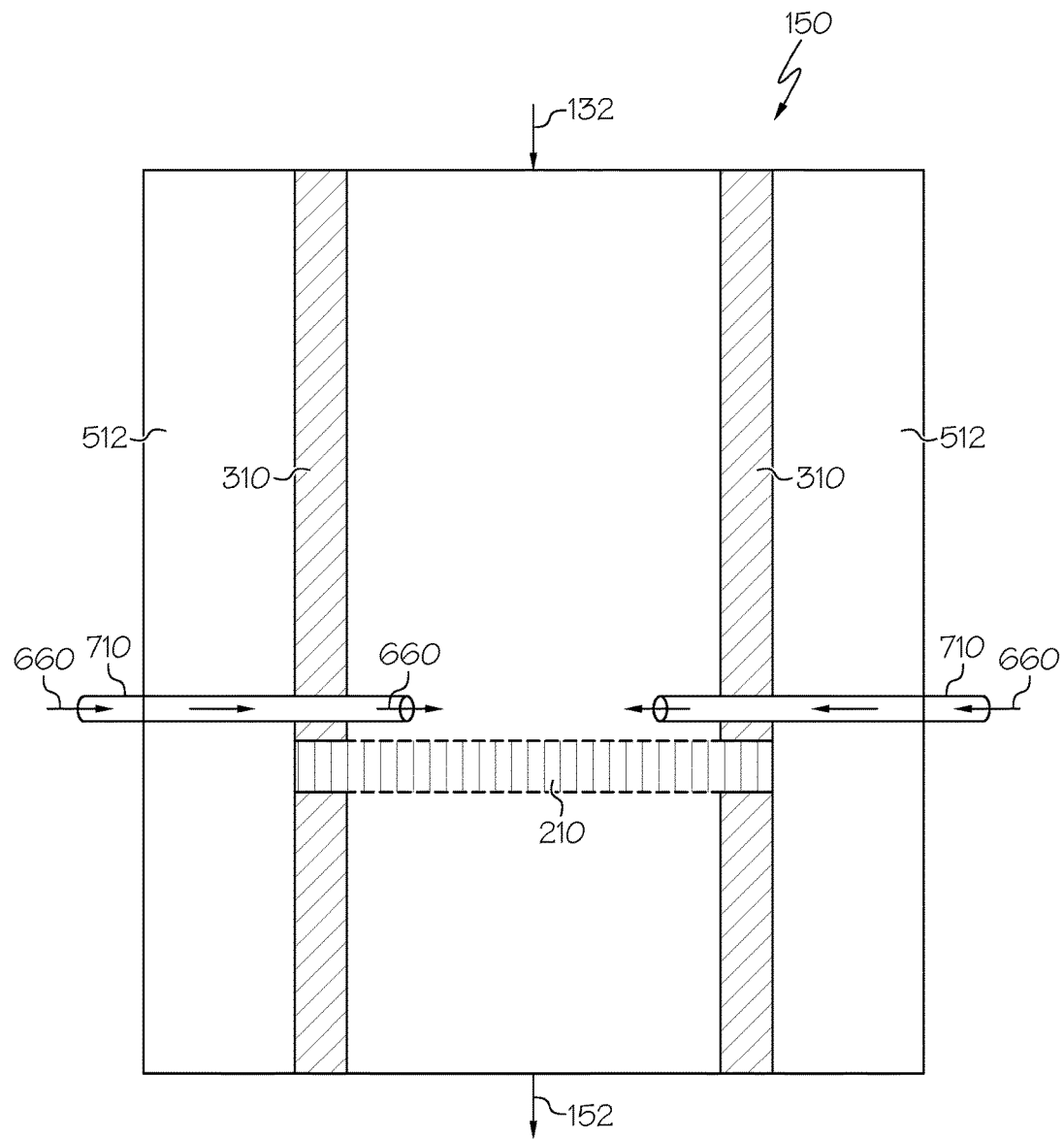
FIG. 4 is a schematic view of one embodiment of a supercritical upgrading reactor comprising catalyst layers and two purging fluid inlets.

Now referring to FIG. 4, a supercritical upgrading reactor 150 is depicted in a downflow configuration comprising a purging fluid inlet 710. The purging fluid inlet 710 may inject purging fluid 660 into the supercritical reactor 150 to help reduce plugging in the catalyst layer 210. In FIG. 4, a catalyst layer 210 is attached to the reactor walls 512 and is supported by an insert 310. FIG. 4 depicts two purging fluid inlets 710 by which purging fluid 660 may be injected into the supercritical upgrading reactor 150. The heavy fractions may, in some embodiments, cause unwanted plugging of the catalyst layer 210 due to their large nature and propensity to clump and aggregate. Purging fluid 660 may be injected into the catalyst layer 210 to remove materials embedded in the catalyst layer. The purging fluid 660 may, in some embodiments, comprise supercritical water, supercritical water containing non-asphaltenic aromatic hydrocarbons including, but not limited to, benzene, toluene, xylene, and similar compounds, supercritical water containing product oil, or combinations thereof. The purging fluid 660 may, in some embodiments, contain oxygen-containing fluids, such as water saturated with molecular oxygen, water containing hydrogen peroxide ($H_2O_2$), water containing organic peroxide, hydrocarbons containing organic peroxide, similar compounds, or combinations of any of these. Without being bound by any particular theory, flowing oxygen-containing fluids through the system may oxidize contaminants on the catalyst layer 210 to $CO_2$ and $H_2O$, producing or otherwise giving off heat as a reactionary byproduct. FIG. 4 depicts that in some embodiments, the purging fluid inlets 710 are positioned such that the purging fluid 660 flows parallel to the catalyst layer 210. This configuration may allow the compounds present in the heavy fraction 220 to flow across the catalyst layer 210 to encourage upgrading reactions.

In some embodiments, the purging fluid 660 may be injected as needed, or on a schedule. The purging fluid 660 may be injected manually or automatically. In some embodiments of the present invention, the purging fluid 660 may be injected when the downflow supercritical upgrading reactor 150 experiences a drop in pressure. The pressure of the downflow supercritical upgrading reactor 150 may, in some embodiments, be monitored to determine the pressure differential across the catalyst layer 210. The pressure may also be monitored to determine the pressure downstream of the catalyst layer 210. The pressure differential of the catalyst layer 210 may indicate that the catalyst layer 210 is clogged. The pressure downstream of the catalyst layer 210 may indicate clogging of the catalyst layer 210 and is additionally important in monitoring the reaction scheme, as the supercritical upgrading reactor 150 should not drop below critical pressure.

In some embodiments, purging fluid 660 may be introduced when pressure within the reactor deviates from the operating pressure. In some embodiments, the purging fluid 660 may remove plugged material from the catalyst layer 210 when the pressure has deviated beyond 1%, or beyond 3%, or beyond 5%, or beyond 10% of the operating pressure. In some embodiments, the purging fluid 660 may be injected when the pressure has deviated less than 2% from the operating pressure, such as less than 1.5% or less than 0.5%.

The purging fluid 660 may be injected continuously or intermittently, such as in a stepwise fashion, until an optimal operating pressure is reached. Various pressure measuring devices are contemplated for measuring the operating pressure. For example, these pressure measuring devices may include, but are not limited to, pressure gauges, pressure transducers, pressure sensors, and combinations thereof, may be installed at locations where plugging can happen. In one or more embodiment, the pressure difference should not exceed 10% of operating pressure (2.5 MPa at 25 MPa or 360 psig at 3611 psig operating pressure). In one or more embodiments, the purging fluid inlets 710 may be triggered automatically when the reactor pressure deviates from the operational pressure by an unacceptable amount.

Still referring to FIG. 4, the purging fluid 660 may, in some embodiments, be heated and pressurized. In one or more embodiments, the temperature of the purging fluid 660 may be within 200° C. of the internal fluid temperature of the injection point, or within 150° C. of the internal fluid temperature of the injection point, or within 100° C. of the internal fluid temperature of the injection point, or within 50° C. of the internal fluid temperature of the injection point, or within 25° C. of the internal fluid temperature of the injection point. Moreover, the pressure of the purging fluid 660 may be a pressure of 100% to 120% of the pressure of the internal fluid at the injection location. In this case, if purging fluid 660 is injected into a reactor which is operating at approximately 25 MPa at normal unplugged condition, the purging fluid 660 may be injected at a pressure in the range of 25 to 30 MPa, which is 100% to 120%, respectively, of the pressure of the internal fluid. Furthermore, the flow rate of the purging fluid 660 may be injected at a flow rate of 0.001% to 10% of the flow rate of the combined feed stream 132. For example, if the flow rate of internal fluid is 100 liters per hour (L/hr) at standard ambient temperature and pressure (SATP), the flow rate of the purging fluid should be in the range of 0.001 to 10 L/hr, which is 0.001% to 50% of the flow rate of the combined feed stream 132. The flow rate may be determined experimentally through adjustments during operation. The flow rate of the purging fluid and of the supercritical reactor may depend on the properties of the combined feed stream 132. Factors influencing the flow rate of the purging fluid, the supercritical upgrading reactor 150, or both, may include but are not limited to the amount of pressure in the supercritical upgrading reactor 150, the composition of the combined feed stream 132, the amount of heavy fractions 220 present in the supercritical reactor, and the positioning and frequency of the purging fluid inlets 710.

The purging fluid 660, may, in some embodiments, unplug the catalyst layer 210 using chemical means, including, but not limited to using a solvent or a cleaning fluid to dislodge a compound plugging the catalyst layer 210. In other embodiments, the purging fluid 660 may unplug the catalyst layer 210 using physical means, including, but not limited to using microturbulence, heat transfer or physical impact to dislodge a compound plugging the catalyst layer.

Again referring to FIG. 4, the purging fluid inlets 710 may be located in various positions along the supercritical upgrading reactor 150. There may be one or more purging fluid inlets 710 which may have one or more ports in which to inject the purging fluid 660. Purging fluid inlets 710 may be used in various embodiments of supercritical upgrading reactors 150 in both downflow and upflow configurations. The purging fluid inlets 710 may comprise an injection line, such as tubing. In one or more embodiments, the purging fluid inlets 710 may have an outer diameter of from 0.1 inches to 4 inches, or from 0.1 inches to 2 inches, or from 0.2 to 0.5 inches. In some embodiments, the purging fluid inlets 710 may have an outer diameter of from 1 inch to 3 inches, or from 0.5 inches to 2.5 inches, or from 1 inch to 2 inches, or from 0.1 to 1.5 inches.

Figure 5:
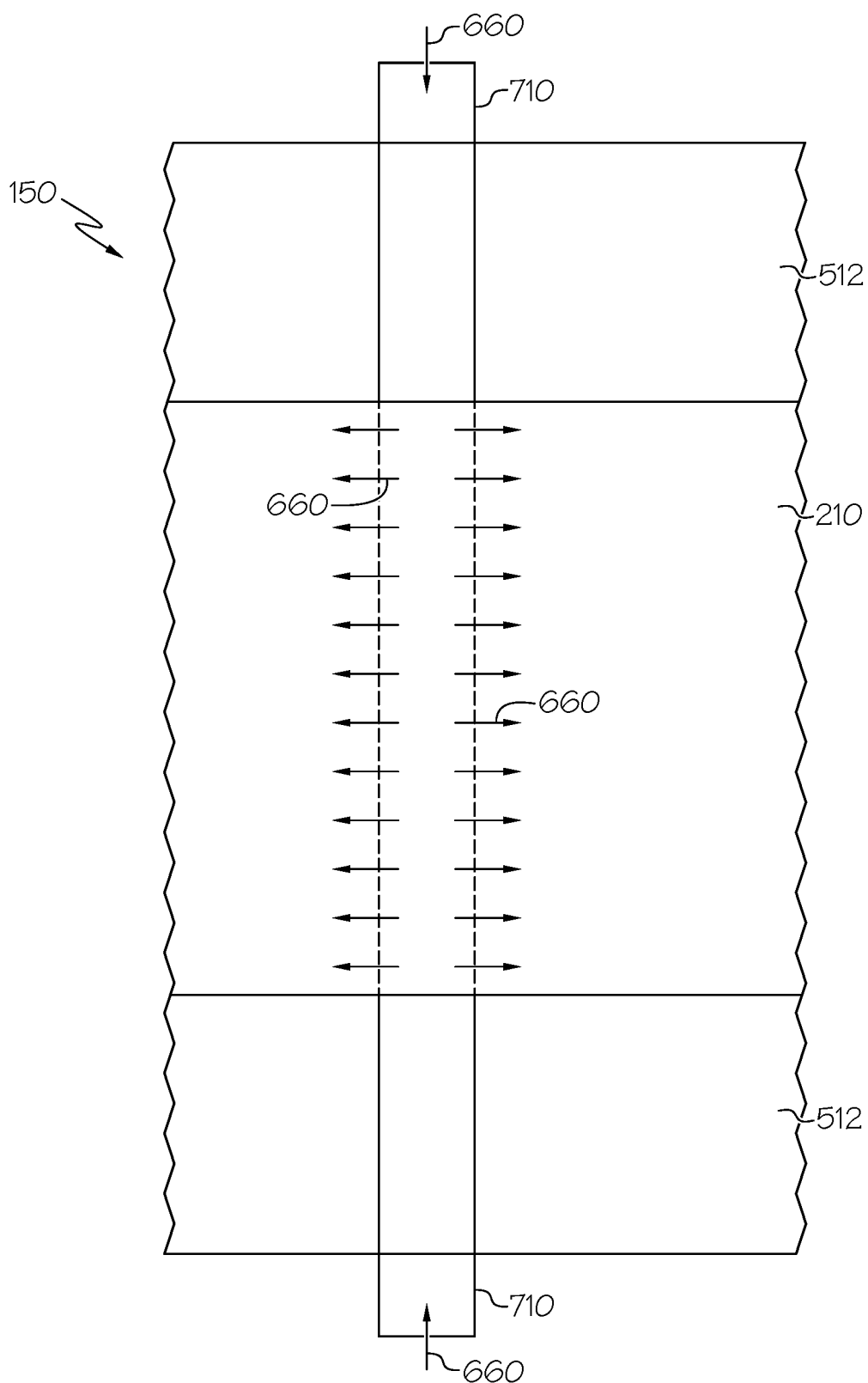
FIG. 5 is an enlarged schematic view of a purging fluid inlet.

Now referring to FIG. 5, an enlarged schematic view of a purging fluid inlet 710 is shown from an overhead cross-sectional view of the supercritical upgrading reactor 150. In FIG. 5, the catalyst layer 210 is attached directly to the reactor walls 512, such as by welding the catalyst layer 210 directly to the reactor wall 512. However, it may be difficult to achieve uniform welding in the reactor, thus, as previously stated, in some embodiments, an insert 310 may be used. As shown, purging fluid 660 may be sprayed through the purging fluid inlets 710, which may have a plurality of orifices or holes extending along the pipe. While FIG. 5 depicts purging fluid flowing in a direction parallel to the catalyst layer 210, the purging fluid 660 may be directed in an upward, downward, sideways, clockwise, counterclockwise formation or in any combination of these directions. The purging fluid 660 may be directed in various directions to optimize the removal of embedded material in the catalyst layer 210 by creating turbulence and agitating the combined feed stream 132 comprising the light and heavy hydrocarbons. The diameter and length of the purging fluid inlets 710 may be adjusted to produce the desired pressure of purging fluid 660, and will vary in accordance with different embodiments of the present disclosure. Moreover, the surface area of the purging fluid inlets 710 and purging fluid 660 flow may also vary in accordance with different embodiments of the present invention.

Figure 6:
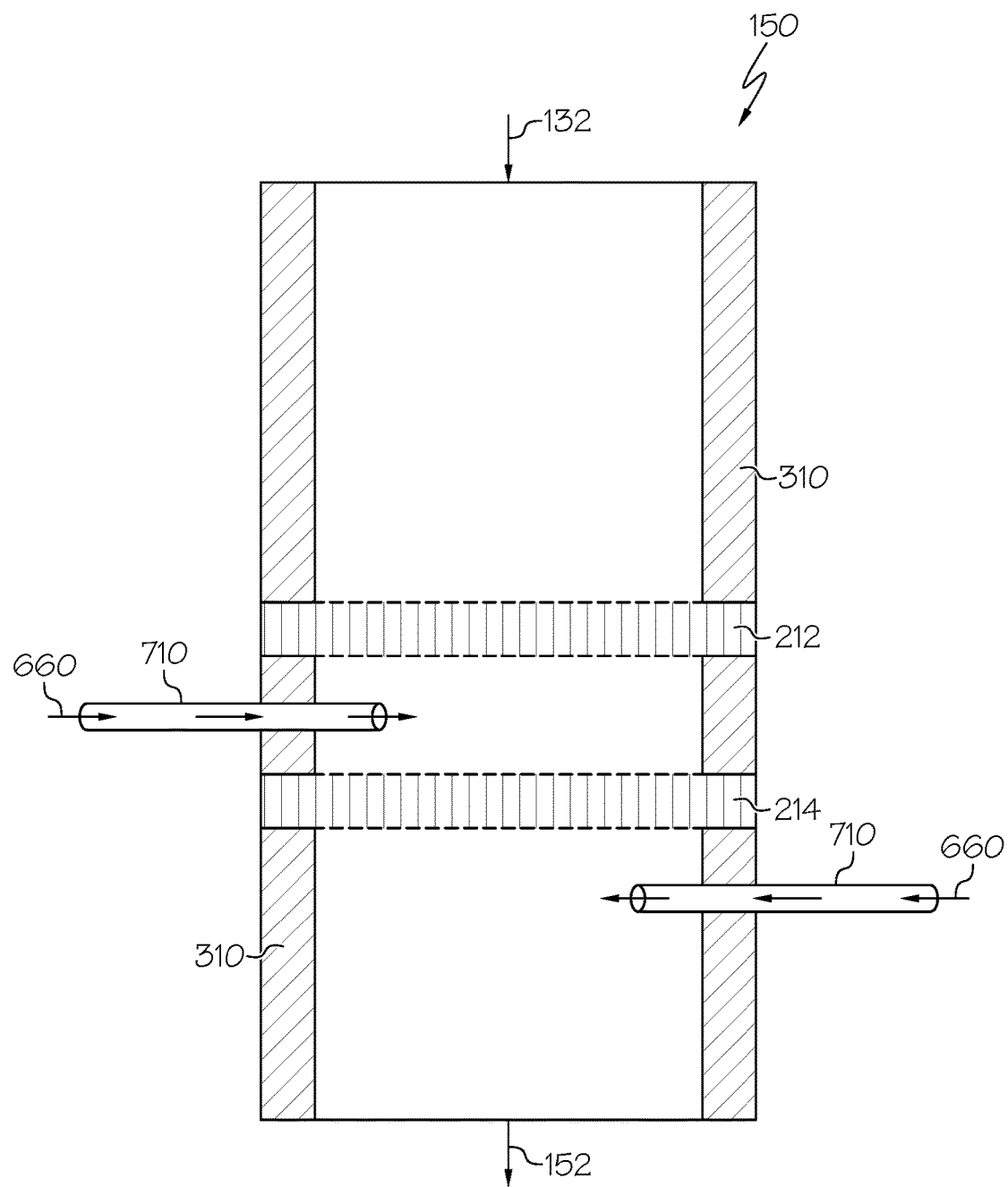
FIG. 6 is a schematic view of one embodiment of a supercritical upgrading reactor comprising two catalyst layers and two purging fluid inlets.

FIG. 6 is a schematic view of one embodiment of the supercritical upgrading reactor 150 comprising a plurality of purging fluid inlets 710 arranged at multiple levels vertically disposed within the downflow upgrading reactor 150. As shown, one linear purging fluid inlet is disposed between a first catalyst layer 212 and a second catalyst layer 214 and another linear purging fluid inlet is disposed below the second catalyst layer 214. That way, if the second catalyst layer 214 is plugged, the purging fluid inlets 710 may inject purging fluid upstream and downstream of the plugged catalyst layer 214 to remove embedded material from the top side, the bottom side, or both sides of the second catalyst layer 214. Some embodiments of the present disclosure may utilize a supercritical upgrading reactor 150 with 2 or more purging fluid inlets 710, such as 3 or more purging fluid inlets 710, or 5 or more purging fluid inlets 710, or 8 or more purging fluid inlets 710. In some embodiments, the supercritical upgrading reactor 150 may comprise 10 or more, or 15 or more, or even 20 or more or 50 or more purging fluid inlets 710.

Figure 7:
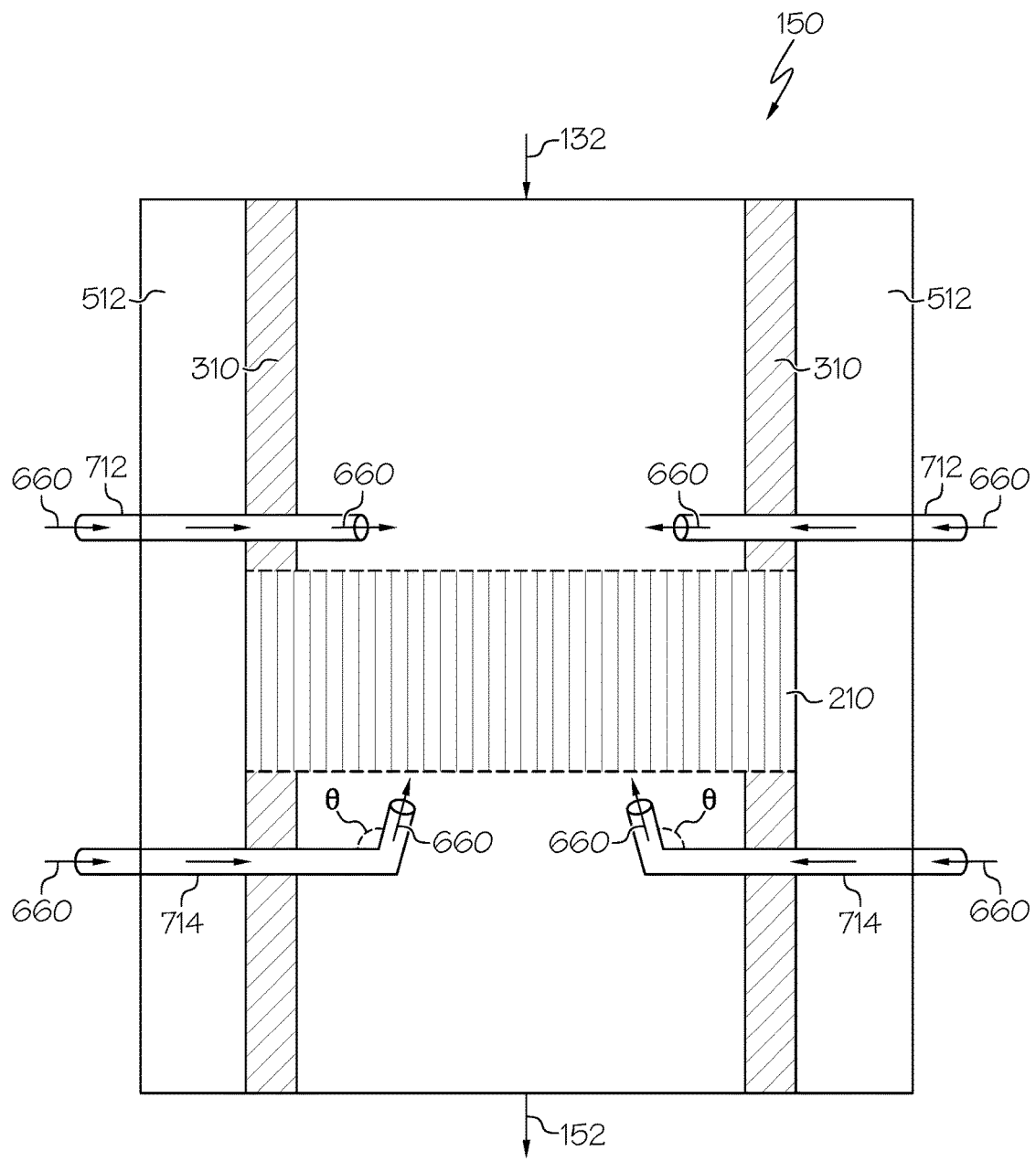
FIG. 7 is a schematic view of one embodiment of the supercritical upgrading reactor comprising a catalyst layer and a plurality of purging fluid inlets.

FIG. 7 is a schematic view of another embodiment comprising a plurality of purging fluid inlets 712 and 714. Specifically, FIG. 7 depicts a supercritical upgrading reactor 150 in a downflow configuration comprising two varying types of purging fluid inlets used in conjunction. FIG. 7 depicts a linear purging fluid inlet 712 and a non-linear purging fluid inlet 714. Liner purging fluid inlet refers to a straight conduit (for example, straight piping or tubing), which may be arranged horizontally, vertically, or diagonally at an angle. In contrast, a non-linear purging fluid inlet 714 refers to a non-straight conduit with at least one bend or curvature along its length. Numerous combinations of linear purging fluid inlets 712 and non-linear purging fluid inlets 714 may be utilized, including using only linear purging fluid inlets 712, using only non-linear purging fluid inlets 714, using both linear purging fluid inlets 712 and non-linear purging fluid inlets 714, or using neither linear purging fluid inlets 712 nor non-linear purging fluid inlets 714. Further, embodiments of the present disclosure may comprise using various combinations of one or more linear purging fluid inlets 712 to one or more non-linear purging fluid inlets 714, including but not limited to using one linear purging fluid inlet 712 and two non-linear purging fluid inlets 714, or vice-versa, using two non-linear purging fluid inlets 714 and three linear purging fluid inlets 712, or vice-versa, and so on.

Still referring to FIG. 7, as previously mentioned, the non-linear purging fluid inlets 714 may exhibit one or more bends or one or more curves. FIG. 7 depicts one embodiment of a non-linear purging fluid inlet 714 with one bend comprising an angle θ, where the angle is defined relative to plane defined by a straight section of the non-linear pipe. The angle θ may be any suitable angle, such as an obtuse, acute, or a right (about 90°) angle. In some embodiments, one or more linear purging fluid inlets 712 may be angled in relation to a plane defined by the catalyst layer. Further, the non-linear purging fluid inlets 714, linear purging fluid inlets 712, or both, may direct the purging fluid 660 in various directions, including but not limited to clockwise, counter-clockwise, up, down, and combinations of these, as previously mentioned.

Referring again to FIG. 7, the linear purging inlet 712 and the non-linear purging fluid inlet 714 may be operated simultaneously or independently. In some embodiments of the disclosure, the purging fluid inlets 712 and 714 may be independently controlled and independently operated such that one or more purging fluid inlets 712 and 714 may be operating while one or more purging fluid inlets 712 and 714 are standby and non-operational. In some embodiments, the purging fluid inlets 712 and 714 may be coordinated to discharge volumes of purging fluid 660 from one or more purging fluid inlets 712 and 714 to create turbulence at the upper surface of the catalyst layer 210. "Turbulence" is used to refer to a conflict or agitation between generally flowing process fluid of the combined feed stream 132 and the purging fluid 660, which may prevent the catalyst from being rendered ineffective due to a heavy fraction blocking access to the catalyst layer 210 as well as mitigating additional catalytic activity in the catalyst layer 210. In some embodiments, the purging fluid 660 may form a counter-current to unplug the catalyst layer 210 to sweep heavy fractions across the catalyst layer 210, which may result in both fluid shear and liquid/solid shear as the heavy fractions are raked across the solid, porous surface of the catalyst layer 210. In some embodiments, the heavy fractions will counter-circulate, which may cause the heavy fractions to chemically or physically break due to the increased residence time in the supercritical environment. In some embodiments, a linear purging fluid inlet 712 may be coordinated with a non-linear purging fluid inlet 714. In some embodiments, this coupling of the purging fluid inlets 712 and 714 may prevent a "dead spot" or eddy from occurring against the upper surface of the catalyst layer 210.

Figure 8:
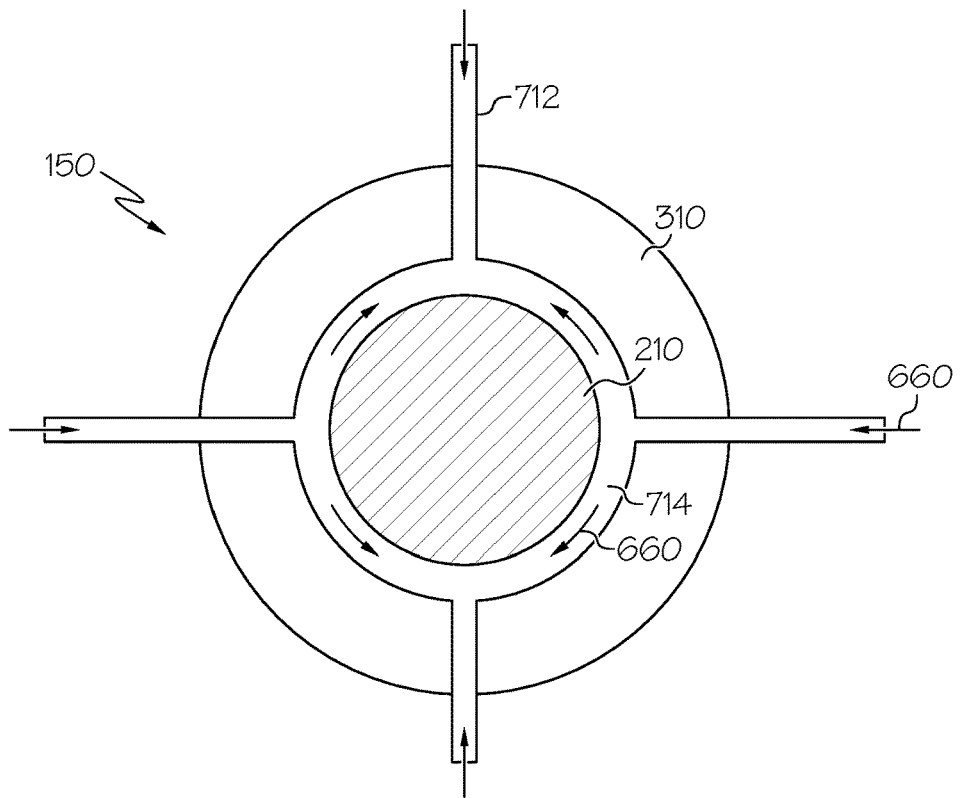
FIG. 8 is a schematic cross-sectional view of one embodiment of a purging fluid inlet.

FIG. 8 is a schematic cross-sectional view of a purging fluid inlet 710 in relation to the catalyst layer 210 as a cross-sectional view of the supercritical upgrading reactor 150. In accordance with one embodiment of the present disclosure, the purging fluid inlets 712, 714 may encircle and surround the catalyst layer 210. The purging fluid 660 may be injected from purging fluid inlets 712, 714 arranged in an annular ring connected to a plurality of linear purging fluid inlets 712. While not shown, the purging fluid inlets 712 and 714 of FIG. 8 may have a plurality of orifices or openings along the annular ring and linear purging fluid inlets 712 may deliver purging fluid to various locations on the proximate catalyst layer 210.

Figure 9:
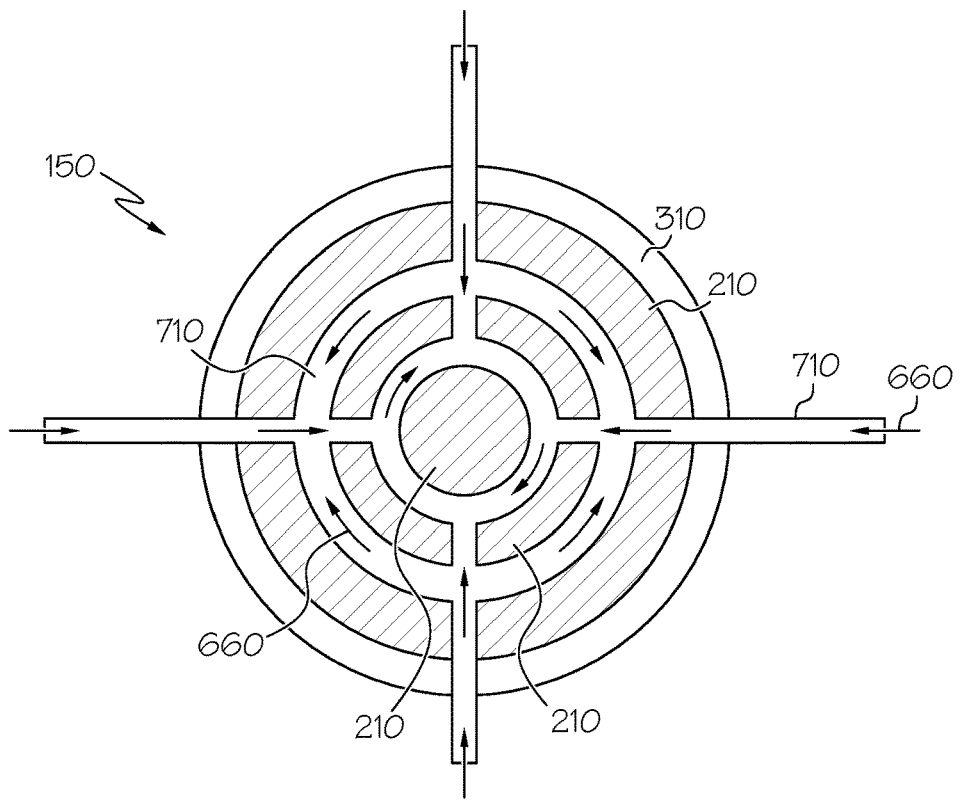
FIG. 9 is a schematic cross-sectional view of another embodiment of a purging fluid inlet.

FIG. 9 is another schematic cross-sectional view of a supercritical upgrading reactor 150 utilizing another embodiment of a purging fluid inlet 710 in relation to a catalyst layer 210. In accordance with another embodiment of the present invention, the purging fluid inlet 710 may comprise an arrangement of a concentric circle formation in conjunction with a plurality of linear pipes. Many arrangements of purging fluid inlets 710 are contemplated depending on the desired application of use and the likelihood and severity of plugging of the catalyst layer 210.

Figure 10:
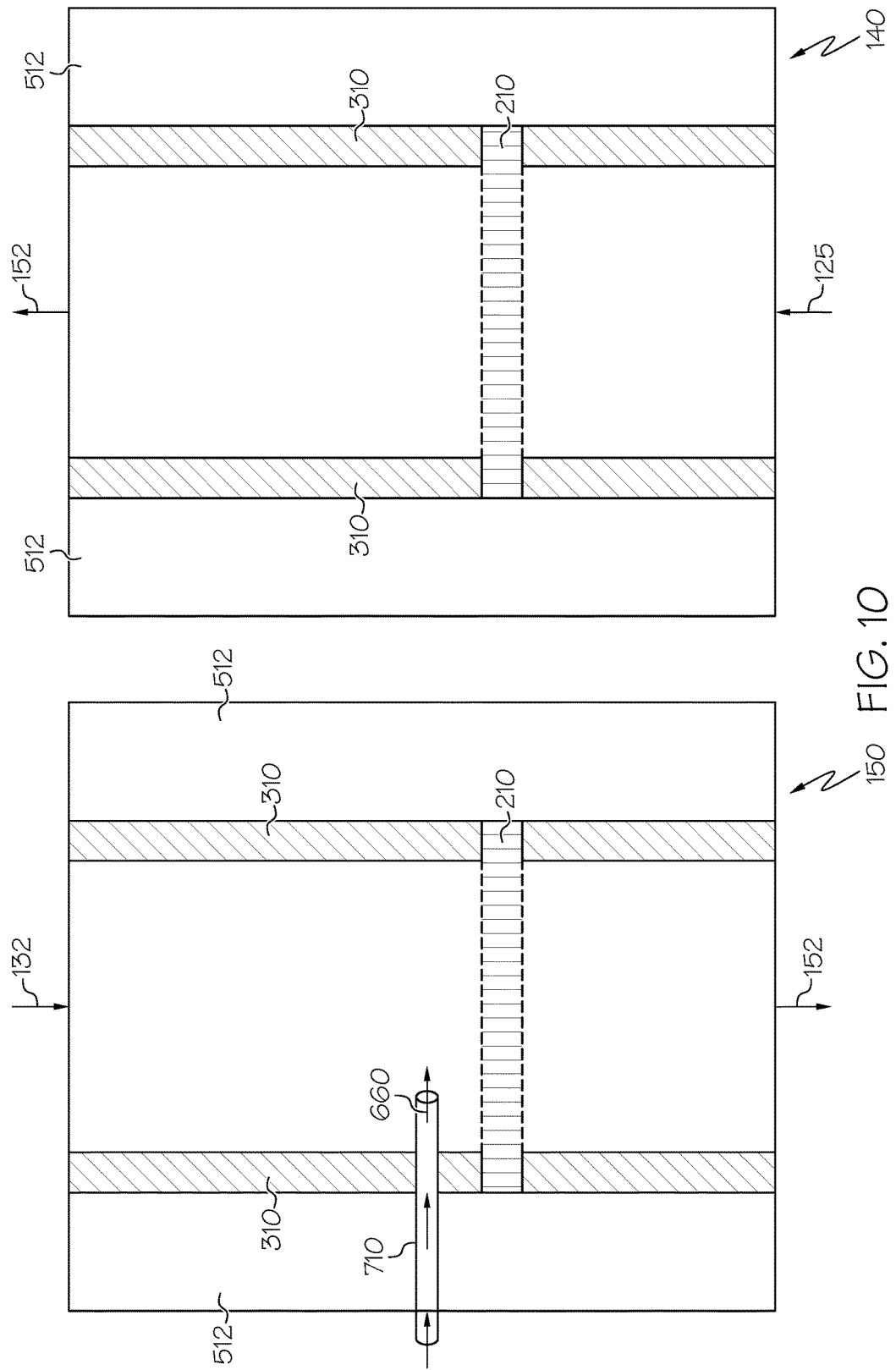
FIG. 10 is a schematic view of an upgrading reactor system with one supercritical upgrading reactor and a supercritical standby reactor.

FIG. 10 is a schematic view of an embodiment of the present disclosure depicting a process 100 in a supercritical reactor system in which one supercritical reactor is a supercritical upgrading reactor 150 while the other supercritical reactor is a supercritical standby reactor 140. As used throughout the disclosure, "standby" refers to a reactor that is not currently upgrading a combined feed stream 132. FIG. 10 depicts a supercritical upgrading reactor 150 in a downflow configuration, in which a combined feed stream 132 is introduced from an inlet in the top of the supercritical upgrading reactor 150 and the supercritical upgrading reactor product 152 exits from an outlet opposite the inlet. The supercritical upgrading reactor 150 may comprise a catalyst layer 210 and an optional insert 310 which may secure the catalyst layer 210 to the reactor walls 512.

FIG. 10 depicts a supercritical standby reactor 140 in an upflow configuration in which a combined feed stream 132 would enter the reactor through a bottom inlet and the supercritical upgrading reactor product 152 would exit from a top opposite the inlet valve. The supercritical standby reactor 140 may comprise a catalyst layer 210 and an optional insert 310 which may secure the catalyst layer to the reactor walls 512. The supercritical upgrading reactor 150 and the supercritical standby reactor 140 may operate separately or in conjunction with one another. In some embodiments, the supercritical upgrading reactor 150 may be operational while the supercritical standby reactor 140 is in standby mode, or vice versa. In some embodiments, the supercritical standby reactor 140 may be flushed with a cleaning fluid.

The cleaning fluid 125 may remove deposits in one or more catalyst layer 210. The cleaning fluid 125 may comprise supercritical water. In some embodiments, the cleaning fluid 125 may comprise supercritical water containing non-asphaltenic aromatic hydrocarbons, including but not limited to benzene, toluene, and xylene. The cleaning fluid 125 may be the same as or a different composition than the purging fluid 660. The cleaning fluid 125 may be in accordance with any of the embodiments previously described with respect to the purging fluid 660. The cleaning fluid 125 could also comprise supercritical water containing product oil or supercritical water containing oxygen. In some embodiments, the supercritical water containing oxygen may be produced from injecting a solution comprising hydrogen peroxide at standard ambient temperature and pressure (SATP). The supercritical water may contain an oxygen content from 0.1 weight percent (wt %) to 2.0 wt %, such as from 0.1 wt % to 0.5 wt %, 0.5 wt % to 1.0 wt %, 1.0 wt % to 1.5 wt %, or 1.5 wt % to 2.0 wt %.

In some embodiments, the supercritical reactors 140 or 150 may alternate between being operational and being in a standby mode, such that one or more supercritical upgrading reactors 150 are operational until one or more supercritical standby reactors 140 have been cleaned with a cleaning fluid 125. In some embodiments, once the cleaning or purging of the reactor and the catalyst layers is sufficient, the supercritical standby reactor 140 may become operational and become a supercritical upgrading reactor 150, while the supercritical upgrading reactor 150 previously in operational mode would convert to a supercritical standby reactor 140 for cleaning.

Figure 11:
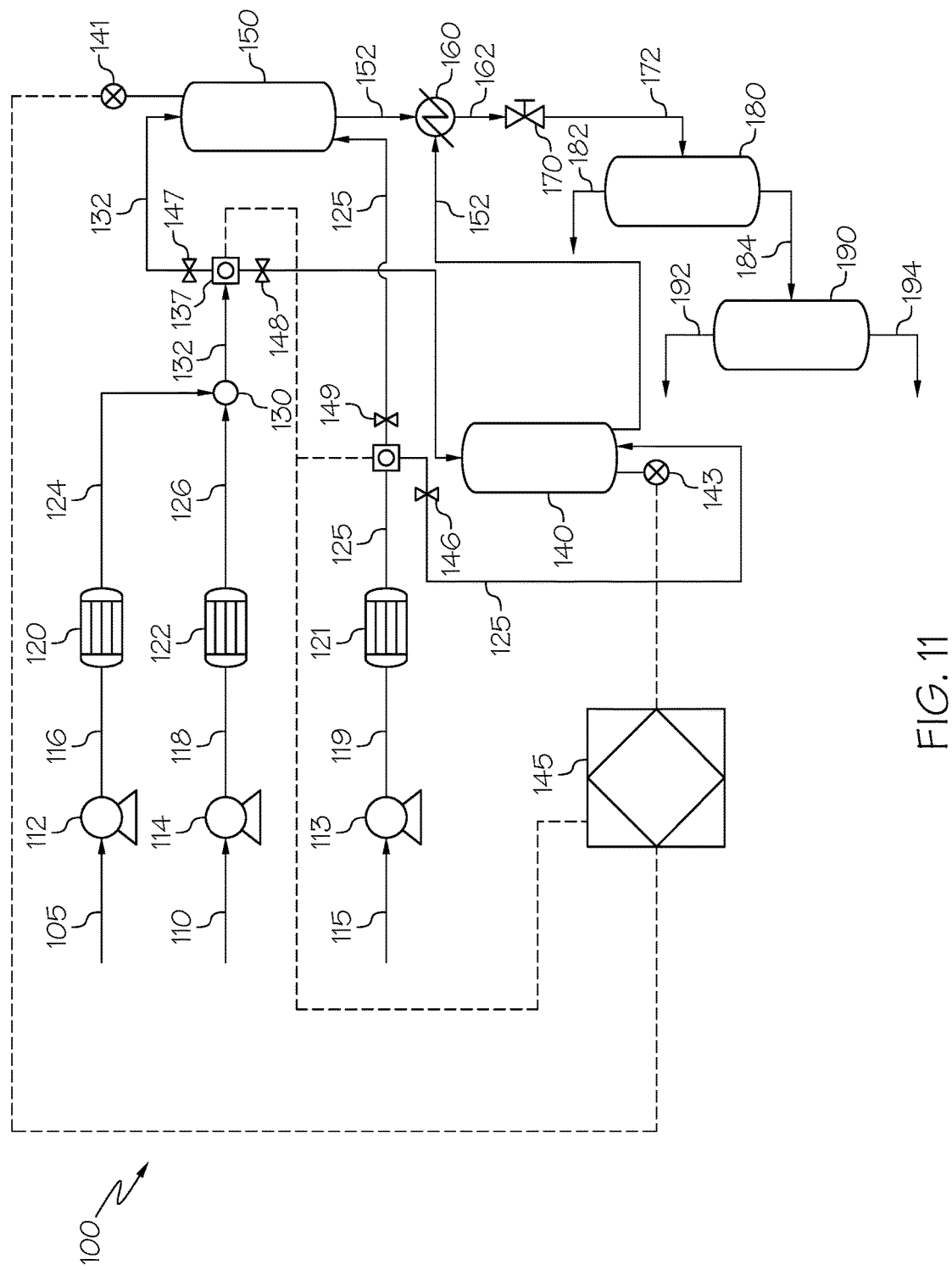
FIG. 11 is a schematic overview of the process for upgrading petroleum-based compositions comprising a supercritical upgrading reactor and a supercritical standby reactor.

Referring now to FIG. 11, a schematic overview of one embodiment of the process 100 for alternating the functionality of the supercritical upgrading reactor 150 and the supercritical standby reactor 140. Like FIG. 1, the process 100 of FIG. 11 depicts a supercritical water stream 126 and the pressurized heated petroleum stream 124 may be mixed in the feed mixer 130 to produce a combined feed stream 132. At the same time, a cleaning fluid 115, which may, in some embodiments, be water, is pressurized by pump 113 to produce a pressurized cleaning fluid stream 119. The pressurized cleaning fluid stream 119 may then be heated in cleaning fluid pre-heater 121 to create a heated, pressurized cleaning fluid 125. The water pre-heater 122, petroleum pre-heater 120, and cleaning fluid pre-heater 121 may exist as independent and separate units or may comprise one large heating unit.

However, unlike FIG. 1, the combined feed stream 132 of FIG. 11 may pass to a flow splitter 137 in communication with a controller unit (for example, a programmable logic controller (PLC) 145), represented by dotted lines in FIG. 11. In some embodiments, the flow splitter 137 will direct the combined feed stream 132 to the downflow upgrading reactor 150 by opening valve 147, which is upstream of the downflow upgrading reactor 150, and closing valve 148, which is upstream of the supercritical standby reactor 140. Likewise, the cleaning fluid 125 may enter a flow splitter 137 in communication with a controller 145. In some embodiments, the controller 145 may be a programmable logic controller (PLC). In some embodiments, the flow splitter 137 will direct the cleaning fluid 125 through open valves 146, which is upstream of the supercritical standby reactor 140, while closing valve 149, which is upstream of the supercritical upgrading reactor 150.

Further as shown in FIG. 11, the supercritical standby reactor 140 may, in some embodiments, contain one or more pressure sensors 143. Likewise, the supercritical upgrading reactor 150 may contain a pressure sensor 141. The pressure sensors 141 or 143 may be upstream or downstream of the supercritical upgrading reactor 150, the supercritical standby reactor 140, or both. Pressure sensors 141 or 143 may include pressure gauges, pressure transducers, or combinations of both. The pressure sensors 141 or 143 may be configured to alert when the pressure of at least one upgrading reactor has deviated from the operating pressure of the supercritical reactor 140 or 150 by at least 1%. In some embodiments, the pressure sensors 141 or 143 may alert when the pressure has deviated from the operating pressure by at least 0.5%, or at least 2%, or at least 3%, or at least 5%, or at least 8% or at least 10%. The pressure sensors 141 or 143 may be coupled to the controller 145.

Referring again to FIG. 11, if the pressure sensor 141 determines a pressure drop within supercritical upgrading reactor 150, indicative of possible plugging in the catalyst layer, the pressure sensor 141 will signal to the controller 145. In response, the controller 145 may trigger the closure of valve 147, thereby closing the delivery of combined feed stream 132 to the supercritical upgrading reactor 150. At the same time, the controller 145 may trigger the opening of valve 148, thereby diverting delivery of the combined feed stream 132 to the supercritical standby reactor 140, which consequently converts the operation of the supercritical standby reactor 140 from cleaning mode to petroleum upgrading mode. Moreover, the controller 145 will trigger the closure of valve 149 and the opening of valve 146 which thereby diverts cleaning fluid 125 from the supercritical standby reactor 140 to the supercritical upgrading reactor 150, which consequently converts the operation of the supercritical upgrading reactor 150 from petroleum upgrading mode to cleaning mode. In some embodiments, cleaning fluid 125 is injected until the plugging of the catalyst layer has been remedied and the pressure deviation has been reduced to an acceptable level.

In some embodiments, the controller 145 may cause an alarm or alert to trigger based on the pressure reading transmitted by the pressure sensors 141 or 143. In some embodiments, the alarm or alert may be transmitted to an electronic device, including, but not limited to, a computer or processor. In other embodiments, the alarm or alert may be a sound, flashing light, notification, or other method of indication. The controller 145 may, in some embodiments, automatically cause an injection of purging fluid 660 in response to the pressure readings transmitted by the pressure sensors 141 or 143.

It should be apparent to those skilled in the art that various modifications and variations can be made to the described embodiments without departing from the spirit and scope of the claimed subject matter. Thus, it is intended that the specification cover the modifications and variations of the various described embodiments provided such modification and variations come within the scope of the appended claims and their equivalents.

Examples

Various features of the present embodiments are illustrated in the Examples below. A simulation was run in accordance with the process 100 depicted in FIGS. 1 and 4, in which a petroleum-based composition 105 was pressurized in a high pressure metering pump 112 to create a pressurized petroleum-based composition 116 with a pressure of 1 liter per hour at SATP. The pressurized petroleum-based composition 116 was heated to 150° C. to form a pressurized, heated petroleum-based composition 124. A water stream 110 was pressurized by a high pressure metering pump 114 to produce pressurized water stream 118 with a pressure of 2 liters per hour at SATP. The pressurized water stream 118 was then heated in a pre-heater 122 to create a supercritical water stream 126 at a temperature of 380° C. The supercritical water stream 126 and the heated, pressurized petroleum-based composition 124 were combined in a simple tee fitting mixer to create a combined feed stream 132. Referring to FIG. 4, the combined feed stream 132 was then introduced into a supercritical upgrading reactor 150 in a downflow configuration containing a catalyst layer 210 and multiple purging fluid inlets 710.

The supercritical upgrading reactor 150 was 400 mm in length and 60 mm in diameter with a supportive annular insert 310 having a thickness of 5 mm. The supercritical upgrading reactor 150 and insert 310 both comprised SUS 316 Grade Stainless Steel. The supercritical upgrading reactor 150 was cylindrical in nature and substantially circular in cross section. A tubular heater surrounded the supercritical upgrading reactor and the internal temperature was monitored by a thermocouple located in the center of the supercritical upgrading reactor at a distance of 50 mm from the bottom of the supercritical upgrading reactor outlet valve. The catalyst layer comprised a porous heterogeneous catalyst containing Hastelloy C-276 high nickel alloy gauze having 40 mesh woven, which was located 250 mm from the inlet valve at the top of the supercritical upgrading reactor. The wire diameter of the catalyst was 0.19 mm with the opening area at 49%, referring to the open area not occupied by the wire (for instance, 51 wt % of the mesh is wire and 49 wt % of the mesh is open area. The combined feed stream 132 was introduced to the catalyst layer 210 via an inlet valve located in the top of the supercritical upgrading reactor 150. The inlet valve was 0.25 inches in outer diameter (0.635 cm) and comprised of SUS 316 Grade Stainless Steel pipe.

Tests were performed with and without the porous heterogeneous catalyst layer 210 (Hastelloy C276 high nickel alloy gauze having 40 mesh, woven, 0.19 mm diameter) to show upgrading and removal of impurities from a hydrocarbon feedstock. The results of the tests are shown in Table 1 as follows:

TABLE 1

| Property | | Feedstock | Petroleum Product (with catalyst) | Petroleum Product (without catalyst) |
|---|---|---|---|---|
| API* Gravity | degree | 12.4 | 19.5 | 15.2 |
| Distillation | 5% | 688 | 550 | 634 |
| (True Boiling | 10% | 743 | 625 | 701 |
| Point, ° F.) | 20% | 811 | 710 | 776 |
| | 30% | 864 | 763 | 830 |
| | 50% | 973 | 845 | 935 |
| | 70% | 1090 | 932 | 1057 |
| | 80% | 1154 | 985 | 1124 |
| | 90% | 1223 | 1053 | 1206 |
| | 95% | 1261 | 1094 | 1252 |
| Sulfur | Wt % | 3.9 | 3.2 | 3.7 |
| Nitrogen | Wt. ppm | 2037 | 1450 | 1670 |
| Asphaltenes | Wt % | 4.1 | 0.3 | 2.8 |
| Conradson Carbon | Wt % | 10.4 | 1.5 | 8.2 |
| Vanadium | Wt. ppm | 50.4 | 37.2 | 44.5 |

TABLE 1-continued

| Property | | Feedstock | Petroleum Product (with catalyst) | Petroleum Product (without catalyst) |
|---|---|---|---|---|
| Nickel | Wt. ppm | 16.3 | 5.7 | 11.5 |
| Average Molecular Weight** | | — | 556 | 383 | 473 |

*API refers to the American Petroleum Institute
**Average MW is measured using VPO (Vapor Pressure Osmometry) to determine the mean relative molecular mass in accordance with ASTM D-2502

Table 1 shows that the presence of the catalyst increased the extent of upgrading as well as impurity removal. The remaining amounts of sulfur, nitrogen, asphaltenes, Conradson carbon, vanadium, and nickel are reduced by the addition of a porous heterogeneous catalyst layer to a supercritical water reactor. Surprisingly and unexpectedly, a downflow reactor, which has generally shown poor performance in upgrading hydrocarbons and removing impurities, shows efficient performance because of the porous heterogeneous catalyst layer, and the catalyst layer was stable and did not suffer from degradation in the tests performed.

A first aspect of the present disclosure may be directed to a process for upgrading a petroleum-based composition that includes combining a supercritical water stream with a pressurized, heated petroleum-based composition in a mixing device to create a combined feed stream; introducing the combined feed stream into an upgrading reactor system comprising at least one downflow supercritical upgrading reactor operating at a temperature greater than a critical temperature of water and a pressure greater than a critical pressure of water, where the downflow supercritical upgrading reactor comprises a first catalyst layer and a second catalyst layer, the second catalyst layer disposed vertically below the first catalyst layer in the downflow supercritical upgrading reactor, where the first catalyst layer is a heterogeneous porous metal containing catalyst having a first void volume ratio and the second catalyst layer is a heterogeneous porous metal containing catalyst having a second void volume ratio, where the second void volume ratio differs from the first void volume ratio, and where the downflow supercritical upgrading reactor includes one or more purging fluid inlets disposed on one or more side locations of the downflow supercritical upgrading reactor proximate the first catalyst layer, the second catalyst layer, or both. The process also includes passing the combined feed stream through the first catalyst layer and the second catalyst layer, where light hydrocarbons in the combined feed stream at least partially flow through the first catalyst layer and the second catalyst layer while heavy hydrocarbons in the combined feed stream are at least partially sifted in voids of the first catalyst layer, voids of the second catalyst layer, or both; at least partially converting the sifted heavy hydrocarbons to light hydrocarbons in the first catalyst layer or the second catalyst layer in the presence of the supercritical water; injecting purging fluid through the purging inlets to contact the first catalyst layer, the second catalyst layer, or both to reduce plugging; and passing upgraded product comprising light hydrocarbons and the converted light hydrocarbons out of the downflow supercritical upgrading reactor.

A second aspect of the present disclosure may include the first aspect, in which the second void volume is less than the first void volume ratio.

A third aspect of the present disclosure may include the first and second aspects, where the purging fluid inlets are vertically disposed between the first catalyst layer and the second catalyst layer.

A fourth aspect of the present disclosure may include any of the first through third aspects, where the purging fluid inlets are vertically disposed above the first catalyst layer.

A fifth aspect of the present disclosure may include any of the first through fourth aspects, where the purging fluid inlets comprise one or more angled linear pipes, the angle being relative to a horizontal plane defined by the first catalyst layer.

A sixth aspect of the present disclosure may be directed towards a process for upgrading a petroleum-based composition that includes combining a supercritical water stream with a pressurized, heated petroleum-based composition in a mixing device to create a combined feed stream, and introducing the combined feed stream into an upgrading reactor system comprising at least one supercritical upgrading reactor operating at a temperature greater than a critical temperature of water and a pressure greater than a critical pressure of water. The supercritical upgrading reactor comprises a first catalyst layer and a second catalyst layer, the second catalyst layer disposed vertically below the first catalyst layer in the supercritical upgrading reactor, where the first catalyst layer is a heterogeneous porous metal containing catalyst having a first void volume ratio and the second catalyst layer is a heterogeneous porous metal containing catalyst having a second void volume ratio, and where the second void volume ratio is lesser than the first void volume ratio. The method also includes passing the combined feed stream through the first catalyst layer and the second catalyst layer, where light hydrocarbons in the combined feed stream at least partially flow through the first catalyst layer and the second catalyst layer while heavy hydrocarbons in the combined feed stream are at least partially sifted in voids of the first catalyst layer, voids of the second catalyst layer, or both; at least partially converting the sifted heavy hydrocarbons to light hydrocarbons in the first catalyst layer or the second catalyst layer in the presence of the supercritical water; and passing upgraded product comprising light hydrocarbons and the converted light hydrocarbons out of the supercritical upgrading reactor.

A seventh aspect of the present disclosure may include any of the first through sixth aspects, further comprising activating the first catalyst layer, the second catalyst layer, or both by heating at a temperature of at least 400° C.

An eighth aspect of the present disclosure may include any of the first through seventh aspects, further comprising conditioning the first catalyst layer, the second catalyst layer, or both with supercritical water at the temperature and pressure of the upgrading reactor system prior to introduction of the combined feed stream.

A ninth aspect of the present disclosure may include any of the first through eighth aspects, where the first catalyst layer and the second catalyst layer are in contact with one another.

A tenth aspect of the present disclosure may include any of the first through eighth aspects, where the first catalyst layer and the second catalyst layer are spaced apart a distance.

An eleventh aspect of the present disclosure may include any of the first through eighth and tenth aspects, where a ratio of the first void volume ratio to the second void volume ratio is from 1 to 10.

A twelfth aspect of the present disclosure may include any of the first through eleventh aspects, where the first catalyst layer, the second catalyst layer, or both comprises one or more structures selected from the group consisting of metallic honeycomb, sintered metal disk, or metallic woven cloth.

A thirteenth aspect of the present disclosure may be directed towards a process for upgrading a petroleum-based composition that includes combining a supercritical water stream with a pressurized, heated petroleum-based composition in a mixing device to create a combined feed stream, and introducing the combined feed stream into an upgrading reactor system comprising one or more downflow supercritical upgrading reactors operating at a temperature greater than a critical temperature of water and a pressure greater than a critical pressure of water. The downflow supercritical upgrading reactor comprises at least one catalyst layer, where the at least one catalyst layer is a heterogeneous porous metal containing catalyst having a void volume ratio, and the downflow supercritical upgrading reactor includes at one or more purging fluid inlet disposed on one or more side locations of the downflow supercritical upgrading reactor proximate the catalyst layer. The method also includes passing the combined feed stream through the catalyst layer, where light hydrocarbons in the combined feed stream at least partially flow through the catalyst layer while heavy hydrocarbons in the combined feed stream are at least partially sifted in the voids of the catalyst layer, or both; at least partially converting the blocked heavy hydrocarbons to light hydrocarbons in the catalyst layer in the presence of the supercritical water; injecting purging fluid through the purging inlets to contact the first catalyst layer, the second catalyst layer, or both to reduce plugging; and passing upgraded product comprising light hydrocarbons and the converted light hydrocarbons out of the downflow supercritical upgrading reactor.

A fourteenth aspect of the present disclosure may include any of the first through fifth and thirteenth aspects, where the purging fluid inlets comprise one or more linear pipes extending horizontally within the downflow supercritical upgrading reactor.

A fifteenth aspect of the present disclosure may include any of first through fifth and thirteenth aspects, where the one or more purging fluid inlets comprise one or more linear pipes positioned at an angle, the angle being relative to a horizontal plane defined by the first catalyst layer.

A sixteenth aspect of the present disclosure may include any of the first through fifth and thirteenth aspects, where the one or more purging fluid inlets comprise one or more non-linear pipes, the non-linear pipes including at least one bend or curvature relative to a straight section of the non-linear pipe.

A seventeenth aspect of the present disclosure may include the sixteenth aspect, where the bend is oriented at an angle $\theta$ relative to a plane defined by a straight section of the non-linear pipe.

An eighteenth aspect of the present disclosure may include the seventeenth aspect, where the angle $\theta$ is an acute angle, an obtuse angle, or a 90° angle.

A nineteenth aspect of the present disclosure may include any of the first through fifth and thirteenth aspects, where the one or more purging fluid inlets comprises an annular ring having one or more openings.

A twentieth aspect of the present disclosure may include any of the first through fifth and thirteenth aspects, where the one or more purging fluid inlets comprise multiple pipes.

A twenty-first aspect of the present disclosure may include the twentieth aspect, where the multiple pipes are spaced apart or interconnected.

A twenty-second aspect of the present disclosure may include any of the first through fifth and thirteenth to twenty-first aspects, where the one or more purging fluid inlets have pipes with one or more openings.

A twenty-third aspect of the present disclosure may include any of the first through fifth and thirteenth to twenty-second aspects, where the purging fluid also comprises aromatic hydrocarbons selected from the group consisting of benzene, toluene, xylene, and combinations thereof.

A twenty-fourth aspect of the present disclosure may include any of the first through twenty-third aspects, further comprising one or more pressure sensors upstream and downstream of the downflow supercritical upgrading reactor.

A twenty-fifth aspect of the present disclosure may include the twenty-fourth aspect, where the pressure sensors trigger one the purging fluid inlets to deliver purging fluid when the pressure of the downflow supercritical upgrading reactor deviates from 1%-10% of operating pressure.

A twenty-sixth aspect of the present disclosure is directed to a supercritical upgrading reactor system comprising one or more supercritical upgrading reactors and one or more supercritical upgrading standby reactors, in which the one or more supercritical upgrading reactors and the one or more supercritical standby reactors operate at a temperature greater than a critical temperature of water and a pressure greater than a critical pressure of water; and one or more controllers coupled to at least one of the one or more supercritical upgrading reactors and at least one of the one or more supercritical standby reactors, in which the controller allows the supercritical upgrading reactor are the supercritical standby reactor to alternate functions, such that the supercritical standby reactor is converted to a supercritical upgrading reactor that upgrades a combined feed stream and the supercritical upgrading reactor is converted to a supercritical standby reactor that performs a cleaning operation by the delivery of a cleaning fluid.

A twenty-seventh aspect of the present disclosure may include the twenty-sixth aspect, in which at least one of the one or more controllers is a programmable logic controller.

A twenty-eighth aspect of the present disclosure is directed towards a process for upgrading a petroleum-based composition that includes combining a supercritical water stream with a pressurized, heated petroleum-based composition in a mixing device to create a combined feed stream, and introducing the combined feed stream into an upgrading reactor system comprising one or more supercritical upgrading reactors and one or more supercritical standby reactors. The supercritical upgrading reactor and the supercritical standby reactor both operate at a temperature greater than a critical temperature of water and a pressure greater than a critical pressure of water and the supercritical upgrading reactor and the supercritical standby reactor both comprise at least one catalyst layer, where the at least one catalyst layer is a heterogeneous porous metal containing catalyst having a void volume ratio. The method also includes upgrading the combined feed stream in the supercritical upgrading reactor to produce an upgraded product; cleaning the supercritical standby reactor by passing a cleaning fluid into the supercritical standby reactor, while the upgrading step is being performed in the supercritical upgrading reactor; and alternating functions of the supercritical upgrading reactor and the supercritical standby reactor, such that the supercritical upgrading reactor is converted to a supercritical standby reactor undergoing a cleaning operation by the delivery of the cleaning fluid, while the supercritical standby reactor is converted to a supercritical upgrading reactor that upgrades the combined feed stream.

A twenty-ninth aspect of the present disclosure may include any of the twenty-sixth to twenty-eighth aspects, where the heterogeneous porous metal containing catalyst includes one or more components selected from the group consisting of transition metals and precious metals.

A thirtieth aspect of the present disclosure may include the twenty-ninth aspect, where the transition metals comprise one or more metal containing components comprising metals selected from the group consisting of Ti, Cr, Mn, Fe, Co, Ni, Cu, Zn, Zr, Mo, and combinations thereof.

A thirty-first aspect of the present disclosure may include the twenty-ninth aspect, where the precious metals comprise one or more metal containing components comprising metals selected from the group consisting of Au, Ag, Pt, Ro, Rh, Os, and combinations thereof.

A thirty-second aspect of the present disclosure may include any of the twenty-sixth to thirty-first aspects, where the heterogeneous porous metal containing catalyst includes metal multilayers or alloys.

A thirty-third aspect of the present disclosure may include any of the twenty-sixth to thirty-second aspects, where the heterogeneous porous metal containing catalyst further comprises promoters.

A thirty-fourth aspect of the present disclosure may include any of the twenty-sixth to thirty-third aspects, further comprising one or more pressure sensors upstream and downstream of the supercritical upgrading reactor, the supercritical standby reactor, or both.

A thirty-fifth aspect of the present disclosure may include the thirty-fourth aspect, where the pressure sensors trigger shutting down the combined feed stream from the supercritical upgrading reactor and commencing a cleaning operation.

A thirty-sixth aspect of the present disclosure may include any of the twenty-sixth to thirty-fifth aspects, where the cleaning fluid comprises supercritical water.

A thirty-seventh aspect of the present disclosure may include any of the twenty-sixth to thirty-sixth aspects, where the cleaning fluid comprises supercritical water and oil.

A thirty-eighth aspect of the present disclosure may include any of the twenty-sixth to thirty-seventh aspects, where the cleaning fluid comprises supercritical water and oxygen, where the oxygen content is between 0.1 weight percent (wt %) and 2.0 wt %.

A thirty-ninth aspect of the present disclosure is directed towards a reactor for upgrading a petroleum-based composition including a first catalyst layer, a second catalyst layer disposed vertically below the first catalyst layer in the supercritical reactor, and a plurality of purging fluid inlets disposed proximate to the first catalyst layer, the second catalyst layer, or both, where the first catalyst layer, and the second catalyst layer comprises at least a heterogeneous porous metal containing catalyst, and where the first catalyst layer comprises a first void volume ratio, and the second catalyst layer comprises at least a second void volume ratio, and where the at least a second void volume ratio is less than the first void volume ratio.

A fortieth aspect of the present disclosure may include the thirty-ninth aspect, where the reactor comprises an outermost metal tubular wall, and an insert coaxially disposed inside the metal tubular wall.

A forty-first aspect of the present disclosure may include the thirty-ninth or fortieth aspects, where the first catalyst layer, the second catalyst layer, and the purging fluid inlets are supported by the insert.

A forty-second aspect of the present disclosure is directed towards a reactor for upgrading a petroleum-based composition including a first catalyst layer and a second catalyst layer disposed vertically below the first catalyst layer in the supercritical reactor, where the first catalyst layer and the second catalyst layer comprise at least a heterogeneous porous metal containing catalyst, where the first catalyst layer comprises a first void volume ratio and the second catalyst layer comprises a second void volume ratio, and where the second void volume ratio is lesser than the first void volume ratio.

A forty-third aspect of the present disclosure may include any of the thirty-ninth to forty-second aspects, where the first catalyst layer and the second catalyst layer comprise different compositions.

A forty-fourth aspect of the present disclosure may include any of the thirty-ninth to forty-third aspects, where the first catalyst layer and the second catalyst layer are in contact with one another.

A forty-fifth aspect of the present disclosure may include any of the thirty-ninth to forty-third aspects, where the first catalyst layer and the second catalyst layer are spaced apart a distance.

A forty-sixth aspect of the present disclosure may include any of the thirty-ninth to forty-third and forty-fifth aspects, where a ratio of the first void volume ratio to the second void volume ratio is from 1 to 10.

A forty-seventh aspect of the present disclosure may include any of the thirty-ninth to forty-sixth aspects, where the first catalyst layer, the second catalyst layer, or both comprises one or structures selected from the group consisting of metallic honeycomb, sintered metal disk, and metallic woven cloth.

A forty-eighth aspect of the present disclosure may include any of the forty-second to forty-seventh aspects, where the reactor comprises an outermost metal tubular wall, and an insert coaxially disposed inside the metal tubular wall.

A forty-ninth aspect of the present disclosure may include the forty-eighth aspect, where the first catalyst layer and the second catalyst layer are supported by the insert.

A fiftieth aspect of the present disclosure is directed to a reactor for upgrading a petroleum-based composition comprising at least one catalyst layer, where the at least one catalyst layer comprises a heterogeneous porous metal containing catalyst having a void volume ratio, and at least one purging fluid inlet disposed proximate the at least one catalyst layer and configured to deliver purging fluid to the at least one catalyst layer.

A fifty-first aspect of the present disclosure may include the fiftieth aspect, where the catalyst layer comprises one or structures selected from the group consisting of metallic honeycomb, sintered metal disk, and metallic woven cloth.

A fifty-second aspect of the present disclosure may include the fiftieth and fifty-first aspects, where the reactor comprises an outermost metal tubular wall, and an insert coaxially disposed inside the metal tubular wall.

A fifty-third aspect of the present disclosure may include the fifty-second aspect, where the first catalyst layer, the second catalyst layer, and the purging fluid inlets are supported by the insert.

A fifty-fourth aspect of the present disclosure may include any of the thirty-ninth to fifty-third aspects, where the heterogeneous porous metal containing catalyst of the catalyst layer includes one or more components selected from the group consisting of transition metals and precious metals.

A fifty-fifth aspect of the present disclosure may include the fifty-fourth aspect, where the transition metals comprise one or more metal containing components comprising metals selected from the group consisting of Ti, Cr, Mn, Fe, Co, Ni, Cu, Zn, Zr, Mo, and combinations thereof.

A fifty-sixth aspect of the present disclosure may include the fifty-fourth aspect, where the precious metals comprise one or more metal containing components comprising metals selected from the group consisting of Au, Ag, Pt, Ro, Rh, Os, and combinations thereof.

A fifty-seventh aspect of the present disclosure may include any of the thirty-ninth to fifty-sixth aspects, where the heterogeneous porous metal containing catalyst of the catalyst layer comprises metal multilayers or alloys.

A fifty-eighth aspect of the present disclosure may include any of the thirty-ninth to fifty-seventh aspects, where the heterogeneous porous metal containing catalyst further comprises promoters.

A fifty-ninth aspect of the present disclosure may include any of the thirty-ninth to forty-first and fifty to fifty-eighth aspects, where the purging fluid inlets comprise one or more linear pipes extending horizontally within the downflow supercritical upgrading reactor.

A sixtieth aspect of the present disclosure may include any of the thirty-ninth to forty-first and fifty to fifty-eighth aspects, where the one or more purging fluid inlets comprise one or more linear pipes positioned at an angle, the angle being relative to a horizontal plane defined by the first catalyst layer.

A sixty-first aspect of the present disclosure may include any of the thirty-ninth to forty-first and fifty to fifty-eighth aspects, where the one or more purging fluid inlets comprise one or more non-linear pipes, the non-linear pipes including at least one bend or curvature relative to a straight section of the non-linear pipe.

A sixty-second aspect of the present disclosure may include the sixty-first aspect, where the bend is oriented at an angle θ relative to a plane defined by a straight section of the non-linear pipe.

A sixty-third aspect of the present disclosure may include the sixty-second aspect, where the angle θ is an acute angle, an obtuse angle, or a 90° angle.

A sixty-fourth aspect of the present disclosure may include any of the thirty-ninth to forty-first and fifty to fifty-eighth aspects, where one or more purging fluid inlets comprises an annular ring having one or more openings.

A sixty-fifth aspect of the present disclosure may include any of the thirty-ninth to forty-first and fifty to fifty-eighth aspects, where one or more purging fluid inlets comprises multiple pipes.

A sixty-sixth aspect of the present disclosure may include the sixty-fifth aspect, where the multiple pipes are spaced apart or interconnected.

A sixty-seventh aspect of the present disclosure may include any of the thirty-ninth to forty-first and fifty to sixty-sixth aspects, where the one or more purging fluid inlets have pipes with one or more openings.

Although the present embodiments have been described in detail, it should be understood that various changes, substitutions, and alterations can be made without departing from the principle and scope of the disclosure. Accordingly, the scope of the present disclosure should be determined by the following claims and their appropriate legal equivalents.

The singular forms "a", "an" and "the" include plural references, unless the context clearly dictates otherwise. Likewise, all ranges may be expressed throughout as from one particular value, and to another particular value. When such a range is expressed, it is to be understood that another embodiment is from the one particular value and to the other particular value, along with all combinations within said range.

What is claimed is:

1. A process for upgrading a petroleum-based composition comprising:
combining a supercritical water stream with a pressurized, heated petroleum-based composition in a mixing device to create a combined feed stream;
introducing the combined feed stream into an upgrading reactor system comprising at least one downflow supercritical upgrading reactor operating at a temperature greater than a critical temperature of water and a pressure greater than a critical pressure of water,
where the downflow supercritical upgrading reactor comprises a first catalyst layer and a second catalyst layer, the second catalyst layer disposed vertically below the first catalyst layer in the downflow supercritical upgrading reactor,
where the first catalyst layer comprises a catalyst having a first void volume ratio and the second catalyst layer comprises a catalyst having a second void volume ratio, and
where the second void volume ratio differs from the first void volume ratio;
passing the combined feed stream through the first catalyst layer and the second catalyst layer, where light hydrocarbons in the combined feed stream at least partially flow through the first catalyst layer and the second catalyst layer while heavy hydrocarbons in the combined feed stream are at least partially sifted in voids of the first catalyst layer, voids of the second catalyst layer, or both;
at least partially converting the sifted heavy hydrocarbons to light hydrocarbons in the first catalyst layer or the second catalyst layer in the presence of the supercritical water; and
passing upgraded product comprising light hydrocarbons and the converted light hydrocarbons out of the downflow supercritical upgrading reactor.

2. The process of claim 1, where the second void volume ratio is less than the first void volume ratio.

3. The process of claim 1, where the catalyst of the first catalyst layer, the second catalyst layer, or both comprises a heterogeneous porous metal alloy, the heterogeneous porous metal alloy comprising nickel, molybdenum, chromium, iron, and tungsten.

4. The process of claim 3, where the heterogeneous porous metal alloy comprises mesh.

5. The process of claim 4, where the heterogeneous porous metal alloy comprises 55 to 60 wt % nickel.

6. The process of claim 1, where the downflow supercritical upgrading reactor includes one or more purging fluid inlets disposed on one or more side locations of the downflow supercritical upgrading reactor proximate the first catalyst layer, the second catalyst layer, or both.

7. A process for upgrading a petroleum-based composition comprising:
combining a supercritical water stream with a pressurized, heated petroleum-based composition in a mixing device to create a combined feed stream,
introducing the combined feed stream into an upgrading reactor system comprising at least one supercritical upgrading reactor operating at a temperature greater than a critical temperature of water and a pressure greater than a critical pressure of water,
where the supercritical upgrading reactor comprises a first catalyst layer and a second catalyst layer, the second catalyst layer disposed vertically below the first catalyst layer in the supercritical upgrading reactor
where the first catalyst layer comprises a catalyst having a first void volume ratio and the second catalyst layer comprises a catalyst having a second void volume ratio, and
where the second void volume ratio is less than the first void volume ratio,
passing the combined feed stream through the first catalyst layer and the second catalyst layer, where light hydrocarbons in the combined feed stream at least partially flow through the first catalyst layer and the second catalyst layer while heavy hydrocarbons in the combined feed stream are at least partially sifted in voids of the first catalyst layer, voids of the second catalyst layer, or both;
at least partially converting the sifted heavy hydrocarbons to light hydrocarbons in the first catalyst layer or the second catalyst layer in the presence of the supercritical water; and
passing upgraded product comprising light hydrocarbons and the converted light hydrocarbons out of the supercritical upgrading reactor.

8. The process of claim 7, where the catalyst of the first catalyst layer, the second catalyst layer, or both comprises a heterogeneous porous metal alloy, the heterogeneous porous metal alloy comprising nickel, molybdenum, chromium, iron, and tungsten.

9. The process of claim 8, where the heterogeneous porous metal alloy comprises mesh.

10. The process of claim 9, where the heterogeneous porous metal alloy comprises 55 to 60 wt % nickel.

11. The process of claim 7, where the supercritical upgrading reactor includes one or more purging fluid inlets disposed on one or more side locations of the supercritical upgrading reactor proximate the first catalyst layer, the second catalyst layer, or both.

* * * * *